United States Patent
Domae et al.

(10) Patent No.: US 10,210,628 B2
(45) Date of Patent: Feb. 19, 2019

(54) POSITION MEASUREMENT APPARATUS FOR MEASURING POSITION OF OBJECT HAVING REFLECTIVE SURFACE IN THE THREE-DIMENSIONAL SPACE

(71) Applicant: MITSUBISHI ELECTRIC CORPORATION, Chiyoda-ku (JP)

(72) Inventors: Yukiyasu Domae, Chiyoda-ku (JP); Makito Seki, Chiyoda-ku (JP); Shintaro Watanabe, Chiyoda-ku (JP); Satoru Sofuku, Chiyoda-ku (JP); Yutaka Ezaki, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/120,682

(22) PCT Filed: Jul. 31, 2014

(86) PCT No.: PCT/JP2014/070233
§ 371 (c)(1),
(2) Date: Aug. 22, 2016

(87) PCT Pub. No.: WO2015/132981
PCT Pub. Date: Sep. 11, 2015

(65) Prior Publication Data
US 2017/0221224 A1      Aug. 3, 2017

(30) Foreign Application Priority Data
Mar. 3, 2014   (JP) .................................. 2014-040636

(51) Int. Cl.
*G06K 9/00*      (2006.01)
*G06T 7/70*      (2017.01)
(Continued)

(52) U.S. Cl.
CPC .............. *G06T 7/70* (2017.01); *G01B 11/002* (2013.01); *G06K 9/4604* (2013.01); *G06T 7/74* (2017.01);
(Continued)

(58) Field of Classification Search
CPC .................... G06T 2207/30204; G01B 11/002
See application file for complete search history.

(56) References Cited

U.S. PATENT DOCUMENTS

| 9,867,549 B2* | 1/2018 | Ernst ....................... A61B 5/055 |
| 2004/0002642 A1* | 1/2004 | Dekel .................. G06K 9/3216 |
| | | 600/407 |

(Continued)

FOREIGN PATENT DOCUMENTS

| JP | 2007-322162 A | 12/2007 |
| JP | 2010-71782 A | 4/2010 |

(Continued)

OTHER PUBLICATIONS

International Search Report dated Nov. 4, 2014 in PCT/JP2014/070233 filed Jul. 31, 2014.

(Continued)

*Primary Examiner* — Oneal R Mistry
(74) *Attorney, Agent, or Firm* — Oblon, McClelland, Maier & Neustadt, L.L.P.

(57) ABSTRACT

A storage device stores capturing conditions including a viewpoint position and a shooting direction of the camera, model data including a shape of a segmented mirror, and feature point data representing a positional relationship among a viewpoint position and feature points. A camera captures the segmented mirror having a reflective surface to obtain a captured image including at least a part of the reflective surface. A marker object has feature points, and is fixed at a predetermined position with respect to the camera.

(Continued)

A feature-point extracting unit extracts multiple feature points from a captured image in which the feature points are reflected in the reflective surface, and determines positions of the feature points within the captured image. A position measuring unit calculates a position of the segmented mirror, based on the capturing conditions, the model data, the feature point data, and the positions of the feature points within the captured image.

20 Claims, 19 Drawing Sheets

(51) Int. Cl.
  *G01B 11/00* (2006.01)
  *G06K 9/46* (2006.01)
  *H04N 5/907* (2006.01)
  *H04N 7/18* (2006.01)
  *G06T 7/73* (2017.01)

(52) U.S. Cl.
  CPC ............ *H04N 5/907* (2013.01); *H04N 7/183* (2013.01); *G06T 2207/30204* (2013.01)

(56) References Cited

U.S. PATENT DOCUMENTS

| | | | |
|---|---|---|---|
| 2010/0017178 A1* | 1/2010 | Tsuk | ................ G01B 11/24 703/6 |
| 2010/0214406 A1 | 8/2010 | Potapenko | |
| 2010/0296724 A1 | 11/2010 | Chang et al. | |
| 2011/0228052 A1 | 9/2011 | Ohnishi et al. | |
| 2016/0005185 A1* | 1/2016 | Geissler | ................ G01S 5/163 348/47 |

FOREIGN PATENT DOCUMENTS

| JP | 2010-197391 A | 9/2010 |
|---|---|---|
| JP | 2011-117832 A | 6/2011 |

OTHER PUBLICATIONS

International Preliminary Report on Patentability and Written Opinion dated Sep. 15, 2016 in PCT/JP2014/070233 filed Jul. 31, 2014 (submitting English translation only).

Extended European Search Report dated Jul. 14, 2017 in Patent Application No. 14884656.1.

Kiriakos N. Kutulakos, et al., "A Theory of Refractive and Specular 3D Shape by Light-Path Triangulation" Proceedings of the Tenth IEEE International Conference on Computer Vision (ICCV'05), XP010856985, 2005, 8 Pages.

Michael Oren, et al., "A Theory of Specular Surface Geometry" IEEE, XP010146997, 1995, pp. 740-747.

Gian Luca Mariottini, et al., "Planar Catadioptric Stereo: Single and Multi-View Geometry for Calibration and Localization" 2009 IEEE International Conference on Robotics and Automation, XP031509843, May 2009, pp. 1510-1515.

Office Action dated Oct. 24, 2017 in Chilean Patent Application No. 2016-002201 (with English language translation).

* cited by examiner

POSITION MEASUREMENT APPARATUS FOR MEASURING POSITION OF OBJECT HAVING REFLECTIVE SURFACE IN THE THREE-DIMENSIONAL SPACE

TECHNICAL FIELD

The present invention relates to a position measurement apparatus and a position measurement method for measuring a position of an object having a reflective surface in the three-dimensional space using a camera.

BACKGROUND ART

As methods for measuring a position of an object having a reflective surface in the three-dimensional space, inventions disclosed in Patent Documents 1 and 2 are known. According to the invention in Patent Document 1, an object having an illuminated reflective surface is captured by two cameras, and the direction of normal for the reflected light reflected by the object having the reflective surface is calculated based on the captured images. Next, according to the invention in Patent Document 1, corresponding pixels between the images are searched based on the direction of normal, and three-dimensional measurement (stereoscopic measurement) is carried out based on a parallax between the corresponding pixels. According to the invention in Patent Document 2, laser spot light is illuminated to an object having a reflective surface, and the light reflected from the object having the reflective surface is observed by two image sensors. Next, according to the invention in Patent Document 2, an incidence vector of the observed reflected light is calculated, and a position of the spot light on the object having the reflective surface is calculated based on the calculated incidence vector.

In addition, as methods for measuring a shape of an object having a mirror reflective surface, inventions disclosed in Patent Documents 3 and 4 are known.

CITATION LIST

Patent Documents

PATENT DOCUMENT 1: Japanese Patent Laid-open Publication No. JP 2010-071782 A;
PATENT DOCUMENT 2: Japanese Patent Laid-open Publication No. JP 2011-117832 A;
PATENT DOCUMENT 3: Japanese Patent Laid-open Publication No. JP 2010-197391 A; and
PATENT DOCUMENT 4: Japanese Patent Laid-open Publication No. JP 2007-322162 A.

SUMMARY OF THE INVENTION

Technical Problem

According to the inventions in Patent Documents 1 and 2, in order to obtain the image of the object having the reflective surface, a special light source is used to illuminate light to the object having the reflective surface. In addition, when observing the light reflected from the object having the reflective surface as disclosed in Patent Documents 1 and 2, there occurs a large difference between the intensity of specularly reflected light from the reflective surface and the intensity of diffusedly reflected light. Therefore, it is necessary to use some countermeasure, such as using a camera having a wide dynamic range or limiting the influence of environmental light. However, these countermeasures may be insufficient to solve the problem of the difference in light intensity, and measuring a position of the object having the reflective surface in the three-dimensional space may be immeasurable. In addition, in the first place, the device cost and energy are needed for illuminating light. Patent Documents 3 and 4 also do not disclose how to solve these problems.

The present invention has been made in view of such circumstances, and an object of the present invention is to solve the above-mentioned problems, and to provide a position measurement apparatus and a position measurement method capable of stably measuring a position of an object having a reflective surface in the three-dimensional space, without using a special light source and a wide dynamic-range camera.

Solution to the Problem

A position measurement apparatus according to an aspect of the present invention includes:

a camera that captures a target object having a reflective surface to obtain a captured image including at least a part of the reflective surface;

a first storage unit that stores capturing conditions including a viewpoint position and a shooting direction of the camera;

a second storage unit that stores model data including a shape of the target object;

a marker object that has a plurality of feature points and is fixed at a predetermined position with respect to the camera;

a third storage unit that stores feature point data representing a mutual positional relationship among the viewpoint position and the feature points;

a feature-point extracting unit that extracts multiple feature points of the plurality of feature points from a captured image that is obtained by the camera and in which the multiple feature points are reflected in the reflective surface, and determines positions of the feature points within the captured image; and a position measuring unit that calculates a position of the target object, based on the capturing conditions, the model data, the feature point data, and the positions of the feature points within the captured image.

Advantageous Effects of Invention

According to the present invention, it is possible to measure a position of an object having a reflective surface in the three-dimensional space, without using a special light source and a wide dynamic-range camera.

DESCRIPTION OF EMBODIMENTS

First Embodiment

In each embodiment of the present invention, a marker object having a plurality of feature points is used in order to measure a position of a target object having a reflective surface (an object whose position is to be measured), the plurality of feature points having a predetermined mutual positional relationship. In a first embodiment of the present invention, a mirror-image object is obtained from a mirror image of the camera and the marker object that are reflected in the reflective surface, the mirror-image object virtually exists, positions of a plurality of the feature points included in the mirror-image object are calculated, and a position and an orientation of the reflective surface are calculated based on the positions of the feature points on the mirror-image object. In the first embodiment of the present invention, in the case that the reflective surface is a known curved surface, a reflective-surface model representing a shape of the reflective surface is used, an approximate plane is determined so as to approximate the reflective surface around a point on the reflective surface at which light from the viewpoint of the camera is perpendicularly reflected (this point is referred to as a mirror-image center point, and will be described in detail later), and then, the reflective-surface model is fitted to the approximate plane.

In this case, the position of the reflective surface is a position of the mirror-image center point on the reflective surface in the three-dimensional space. The orientation of the reflective surface is the direction of normal on a plane tangent to (or contact to) the reflective surface at the mirror-image center point.

Figure 1:
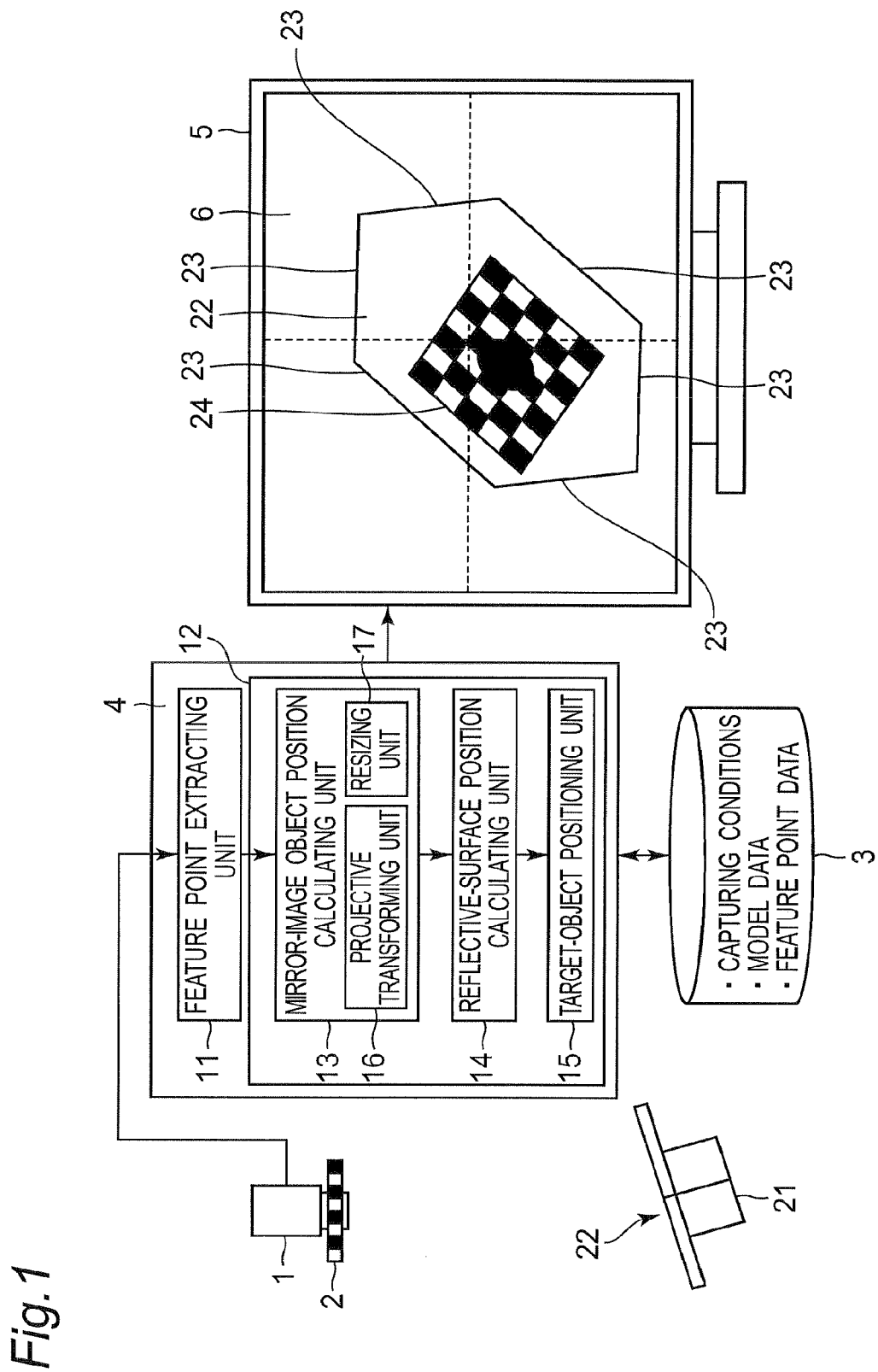
FIG. 1 is a block diagram showing a configuration of a position measurement apparatus according to a first embodiment of the present invention.

FIG. 1 is a block diagram showing a configuration of a position measurement apparatus according to the first embodiment of the present invention. The position measurement apparatus shown in FIG. 1 measures a position of a target object having a reflective surface in the three-dimensional space. The target object is, for example, a segmented mirror 21 that is segmented from reflective surface of a large-aperture reflecting telescope. The segmented mirror 21 has a reflective surface 22, and non-reflective portions that are portions other than the reflective surface 22 (such as edges 23, side surfaces, and a rear surface of the reflective surface 22). For the maintenance of the reflective surface of the reflecting telescope, it is necessary to hold and move the segmented mirror 21 using a holding mechanism, such as a robot hand suspended from a crane. The position measurement apparatus according to the present invention is used, when holding the segmented mirror 21 using the holding mechanism, to measure the position of the segmented mirror 21 in the three-dimensional space, in predetermined precision. A relative position between the holding mechanism and the segmented mirror 21 is known in advance using any other method, for example, within an error of about several tens of centimeters. The position measurement apparatus according to the first embodiment of the present invention obtains the position of the segmented mirror 21 in the precision of, for example, less than about several millimeters. The position measurement apparatus according to the first embodiment of the present invention can also be used to measure a position of any other object having a reflective surface.

The position measurement apparatus shown in FIG. 1 is provided with at least one camera 1, a marker object 2, a storage device 3, and a processing device 4. The camera 1 is adjusted in a common manner in accordance with the environmental light. The camera 1 captures the segmented mirror 21 to obtain an image that includes at least a part of the reflective surface 22 of the segmented mirror 21 (hereinafter referred to as a "captured image"). The marker object 2 includes a plurality of markers fixed at predetermined positions with reference to the camera 1, and has a plurality of feature points. The camera 1 may also have at least one feature point. The marker is a flat figure or a solid figure that has one or more feature points.

The storage device 3 stores, in advance, information which is necessary for measuring a position in the three-dimensional space. The storage device 3 has a first storage unit that stores capturing conditions including a viewpoint position and a shooting direction of the camera 1 at the time of capturing an image, a second storage unit that stores model data including a shape of the segmented mirror 21, and a third storage device that stores feature point data which represents a mutual positional relationship among the viewpoint position and feature points. In the position measurement apparatus according to the first embodiment, the model data includes a reflective-surface model that represents a shape of the reflective surface 22, and includes a positional relationship among the reflective surface 22 and the non-reflective portions. The shape of the reflective surface 22 determined by a curvature radius of the reflective surface 22, forms of outlines (such as a circle, a quadrangle, and a hexagon), and the like. The feature point data includes positions of a plurality of feature points on the marker object 2 with reference to the viewpoint position. The feature point data may further include a position of at least one feature point on the camera 1 with reference to the viewpoint position. In the position measurement apparatus according to the first embodiment, the positional relationship among the feature points stored in advance as the feature point data is in a mirror-image relation with the positional relationship among the actual feature points (an inverted positional relationship). Further, the feature point may be determined with reference to a position which is different from the viewpoint position. The feature point data can be any data so far as the data can represent a mutual positional relationship among the viewpoint position and the feature points. A curvature may be used, instead of the curvature radius.

The processing device 4 determines a position of the segmented mirror 21 in the three-dimensional space, based on the image of the segmented mirror 21 which is captured by the camera 1. The processing device 4 is provided with a feature point extracting unit 11 and a position measuring unit 12. The feature point extracting unit 11 extracts multiple feature points from the captured image that is captured by the camera 1 and in which the multiple feature points are reflected within the reflective surface 22, and determines the positions of the feature points within the captured image. The feature point extracting unit 11 further makes the positions of the feature points within the captured image correspond to the positions of the feature points that are stored in advance as the feature point data. The position measuring unit 12 calculates the position of the segmented mirror 21, based on the capturing conditions, the model data, the feature point data, and the positions of the feature points within the captured image.

The position measurement apparatus may be further provided with a display device 5 that shows an image 6 captured by the camera 1, and/or shows a measurement process and a measurement result of the position of the segmented mirror 21 in the three-dimensional space, etc. The display device 5 facilitates for a user to understand the situation. The position measurement apparatus may be not provided with the display device 5.

As shown in the display device 5 shown in FIG. 1, the image 6 captured by the camera 1 includes the reflective surface 22 and edges 23 of the segmented mirror 21, and a mirror image 24 of the camera 1 and the marker object 2 that are reflected in the reflective surface 22 of the segmented mirror 21. In the first embodiment, it is assumed that a visual field of the camera 1 is sufficiently large for capturing the segmented mirror 21 so that the segmented mirror 21 and the marker object 2 are captured within the visual field of the camera 1. The mirror image of the object means the image of the object that is reflected in the reflective surface 22.

The position measuring unit 12 is provided with a mirror-image object position calculating unit 13, a reflective-surface position calculating unit 14, and a target-object positioning unit 15.

The mirror-image object position calculating unit 13 calculates positions of a plurality of feature points that are included in the mirror-image object representing the camera 1 and the marker object 2 which virtually exists at the opposite side to the side existing the camera 1 and the marker object 2 with respect to the reflective surface 22, based on the positions of the feature points that are stored in advance as the feature point data. The mirror-image object is a virtual object that exists at the opposite side to the side existing the camera 1 with respect to the reflective surface 22 so that, assuming that the reflective surface 22 does not exist, the camera 1 can capture the same image as the mirror image 24 of the camera 1 and the marker object 2 that are reflected in the reflective surface 22 (see FIGS. 3, 7, and 8). Since the positional relationship among the plurality of feature points that are included in the mirror-image object is in a mirror image relation with the actual positional relationship among the feature points (an inverted positional relationship), the positional relationship among the plurality of feature points that are included in the mirror-image object is calculated based on the positions of the feature points that are stored in advance as the feature point data. The mirror-image object position calculating unit 13 obtains a virtual captured image by virtually capturing the mirror-image object under the same capturing conditions as that for obtaining the actual captured image by the camera 1 and calculates the positions of the plurality of the feature points included in the mirror-image object to be close to the positions of the plurality of the corresponding feature points within the captured image that are actually obtained by the camera 1 (the feature points within the actual captured image that correspond to the feature points within the virtual captured image). It is not necessary to calculate positions of the entire mirror-image object representing the camera 1 and the marker object 2, and it is only necessary to calculate positions of the mirror-image object for at least the feature points on the camera 1 and the marker object 2. The positions of the entire mirror-image object representing the camera 1 and the marker object 2 may be calculated.

The reflective-surface position calculating unit 14 calculates a position and an orientation of the reflective surface 22, based on the positions of the feature points on the marker object 2 determined according to the viewpoint position and the feature point data (the positions of the feature points that are stored in advance), the positions of the feature points on the mirror-image object that are calculated by the mirror-image object position calculating unit 13, and the curvature radius of the reflective surface 22 that is stored in advance as the model data.

The target-object positioning unit 15 determines a position of the segmented mirror 21, based on the positional relationship among the reflective surface and the non-reflective portions stored in advance as the model data, and based on the position and the orientation of the reflective surface 22 that are calculated by the reflective-surface position calculating unit 14. Specifically, the target-object positioning unit 15 determines a position of the segmented mirror 21 by detecting the positions of the edges 23 of the reflective surface 22.

The mirror-image object position calculating unit 13 calculates the positions of the plurality of feature points that are included in the mirror-image object so as to reduce the differences between the positions of the feature points within the virtual captured image and the positions of the corresponding feature points within the actual captured image. The mirror-image object position calculating unit is provided with a projective transforming unit 16 and a resizing unit 17.

The projective transforming unit 16 determines a projective transformation to be applied to the positions of the feature points within the actual captured image or to the positions of the feature points within the virtual captured image, the projective transformation being determined so that, by applying the projective transformation, a figure formed by the feature points within the virtual captured image and a figure formed by the corresponding feature points within the actual captured image are made geometrically more similar to each other. When the projective transformation is applied to, for example, the positions of the feature points within the virtual captured image, the feature points applied with the projective transformation, and further subjected to enlargement or reduction by an appropriate factor and then subjected to parallel translation, coincide with or are close to the positions of the corresponding feature points within the actual captured image. When there are four or more pairs of corresponding feature points on the actual captured image and the virtual captured image, it is possible to determine a projective transformation by calculating a homography matrix commonly used in the image process and computer vision. This projective transformation represents a difference between an assumed attitude of the mirror-image object and an attitude of the camera 1 and the marker object 2 that are actually captured by the camera 1 (the actual attitude of the mirror-image object).

The resizing unit 17 determines, after applying the determined projective transformation to the positions of the feature points within the actual captured image or to the positions of the feature points within the virtual captured image, a resizing factor to be applied to the figure formed by the feature points within the virtual captured image or to the figure formed by the corresponding feature points within the actual captured image, the resizing factor is determined so as to reduce the differences between the positions of the feature points within the virtual captured image and the positions of the corresponding feature points within the actual captured image by applying the resizing factor. In other words, the resizing unit 17 determines such a resizing factor that the figure formed by the feature points within the virtual captured image is made more congruent with the figure formed by the corresponding feature points within the actual captured image by applying the resizing factor. The resizing factor may be one.

The mirror-image object position calculating unit 13 changes positions of the plurality of feature points that are included in the mirror-image object, based on the determined projective transformation and the determined resizing factor. The mirror-image object position calculating unit 13 iteratively calculates the projective transformation and the resizing factor, until the differences between the positions of the feature points within the virtual captured image and the positions of the corresponding feature points within the actual captured image are less than a predetermined threshold value (permissible error). The threshold value is set as a maximum absolute value of errors between the positions of the respective feature points, a sum of absolute values of errors between the positions of the respective feature points, and a sum of squares of errors between the positions of the respective feature points.

After the target-object positioning unit 15 determines a position of the segmented mirror 21, the position measurement apparatus may transmit the determined position of the segmented mirror 21 to an external device (not shown) for a further process (for example, a process of holding and moving the segmented mirror 21 using the holding mechanism).

The storage device 3 (the first storage unit) may store a set of capturing conditions that include one viewpoint position and one shooting direction of the camera 1. In this case, the position measuring unit 12 may calculate the position of the segmented mirror 21, based on the capturing conditions, the model data, and feature point data, a feature point set including positions of the plurality of feature points within the captured image.

Figure 2:
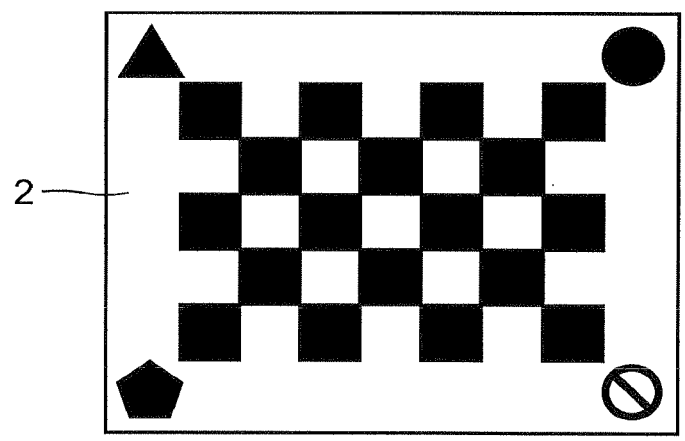
FIG. 2 is a diagram showing an example of a pattern of a marker object 2 included in the position measurement apparatus according to the first embodiment of the present invention.

FIG. 2 is a diagram showing an example of a pattern of the marker object 2 included in the position measurement apparatus according to the first embodiment of the present invention. The marker object 2 shown in FIG. 2 has a plurality of squares (markers) that form a rectangular region in a checkered pattern, and four kinds of mutually different symbols (figures) that are provided at four corners of the rectangular region, respectively. The markers have feature points, such as vertexes or a centroid of the individual figure. In addition, at least a part of a housing of the camera 1 may be used as one or more feature points. The storage device 3 stores the positions of the plurality of feature points that are included in the camera 1 and the marker object 2, as a model of the camera 1 and the marker object 2. The origin of the coordinates may be the viewpoint position of the camera 1 or any other position. Since the positions of the feature points are known, distances and orientations among the feature points are also known. In the example shown in FIG. 2, since the four kinds of mutually different symbols are provided in the marker object 2, the left, right, top, and bottom of the marker object 2 can be distinguished. Further, in the example shown in FIG. 2, when the image 6 captured by the camera 1 includes the mirror image 24 of the camera 1 and the marker object 2 that are reflected in the reflective surface 22 of the segmented mirror 21, a plurality of feature points that are included in the camera 1 and the marker object 2 (the model stored in the storage device 3) can be made correspond to a plurality of feature points that are included in the mirror image 24.

The checkered pattern of the marker object 2 shown in FIG. 2 is an example. The marker object 2 may include other markers or marks having shaped features, which are arranged two-dimensionally or three-dimensionally, such as a plurality of circles that form a polka-dotted pattern. For example, when the marker is a circle, the center of the circle may be used as a feature point. In addition, it is not limited to use the four symbols in order to distinguish the left, right, top, and bottom of the marker object 2. In addition, it is not necessary to use a special symbol in order to distinguish the left, right, top, and bottom of the marker object 2. For example, it is possible to distinguish the left, right, top, and bottom of the marker object 2 by applying to at least one marker, a color different from the colors of other markers. In this case, the storage device 3 further stores the colors of the makers. The marker object is not limited to be arranged two-dimensionally, like the checkered pattern, and it is only necessary that the marker object has a plurality of feature points arranged at predetermined positions with respect to the position of the camera 1, respectively.

Figure 3:
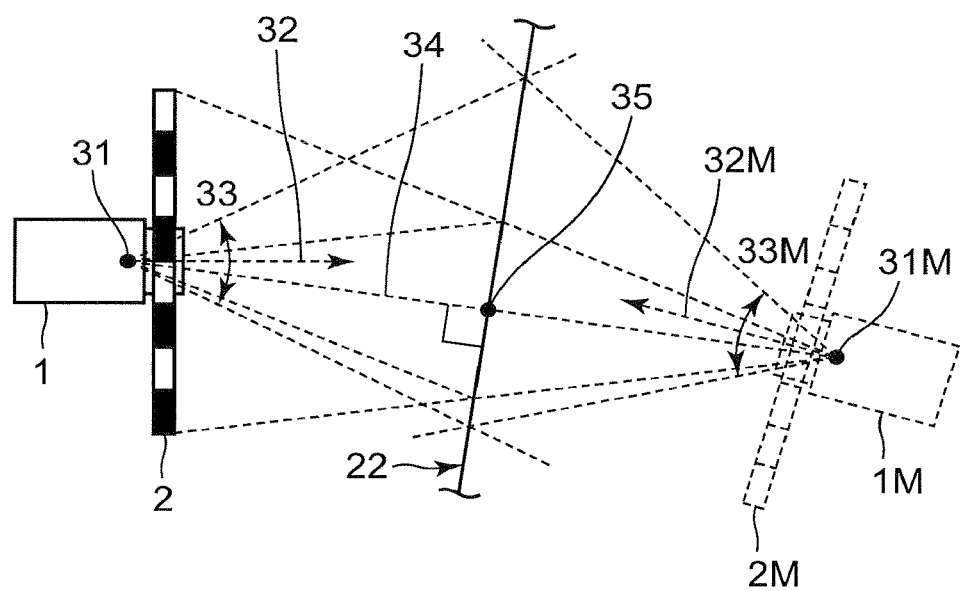
FIG. 3 is a diagram for explaining a relationship among a camera and a marker object, a reflective surface, and a mirror-image object representing the camera and the marker object, in the position measurement apparatus according to the first embodiment of the present invention.

FIG. 3 is a diagram for explaining a relationship among the camera 1 and the marker object 2, the reflective surface, and the mirror-image object representing the camera 1 and the marker object 2, in the position measurement apparatus according to the first embodiment of the present invention. The relationship among the camera 1 and the marker object 2, the reflective surface 22, and the mirror-image object representing the camera 1 and the marker object 2 will be described with reference to FIG. 3. A virtual camera 1M and a virtual marker object 2M virtually exist as the mirror-image object representing the camera 1 and the marker object 2 and formed by the reflective surface 22. The camera 1 has a viewpoint 31, a shooting direction 32, and a visual field 33. The virtual camera 1M which is a part of the mirror-image object has a virtual viewpoint 31M, a virtual shooting direction 32M, and a virtual visual field 33M. When the camera 1 captures an image in which the lens (not shown) of the camera 1 is reflected in the reflective surface 22, the light from one point in the lens (that is, the light from the viewpoint 31 of the camera 1) perpendicularly enters the reflective surface 22, is perpendicularly reflected by the reflective surface 22, and reaches the viewpoint 31 of the camera 1. At this time, a straight line that passes through the viewpoint 31 of the camera 1 and the viewpoint 31M of the virtual camera 1M perpendicularly intersects the reflective surface 22. Hereinafter, the straight line that passes through the viewpoint 31 of the camera 1 and the viewpoint 31M of the virtual camera 1M is referred to as a reflective-surface perpendicular line. The intersection of a reflective-surface perpendicular line 34 and the reflective surface 22 is referred to as a mirror-image center point 35.

Figure 4:
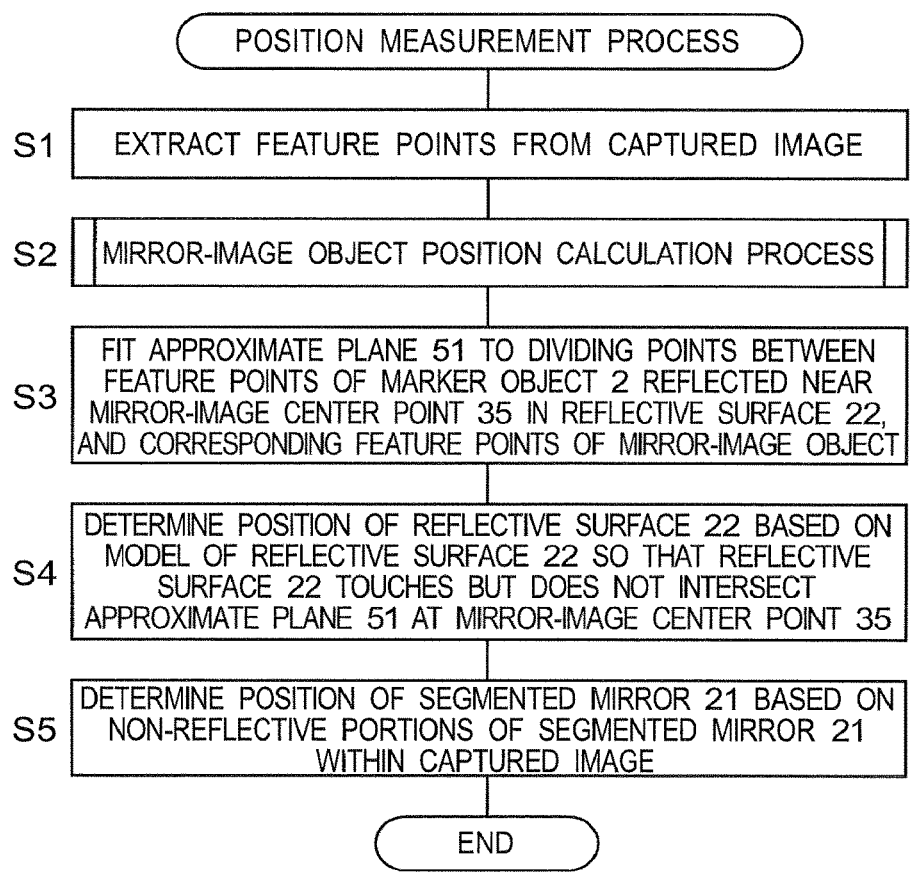
FIG. 4 is a flowchart for explaining a position measurement process that is executed by the position measurement apparatus according to the first embodiment of the present invention.
Figure 5:
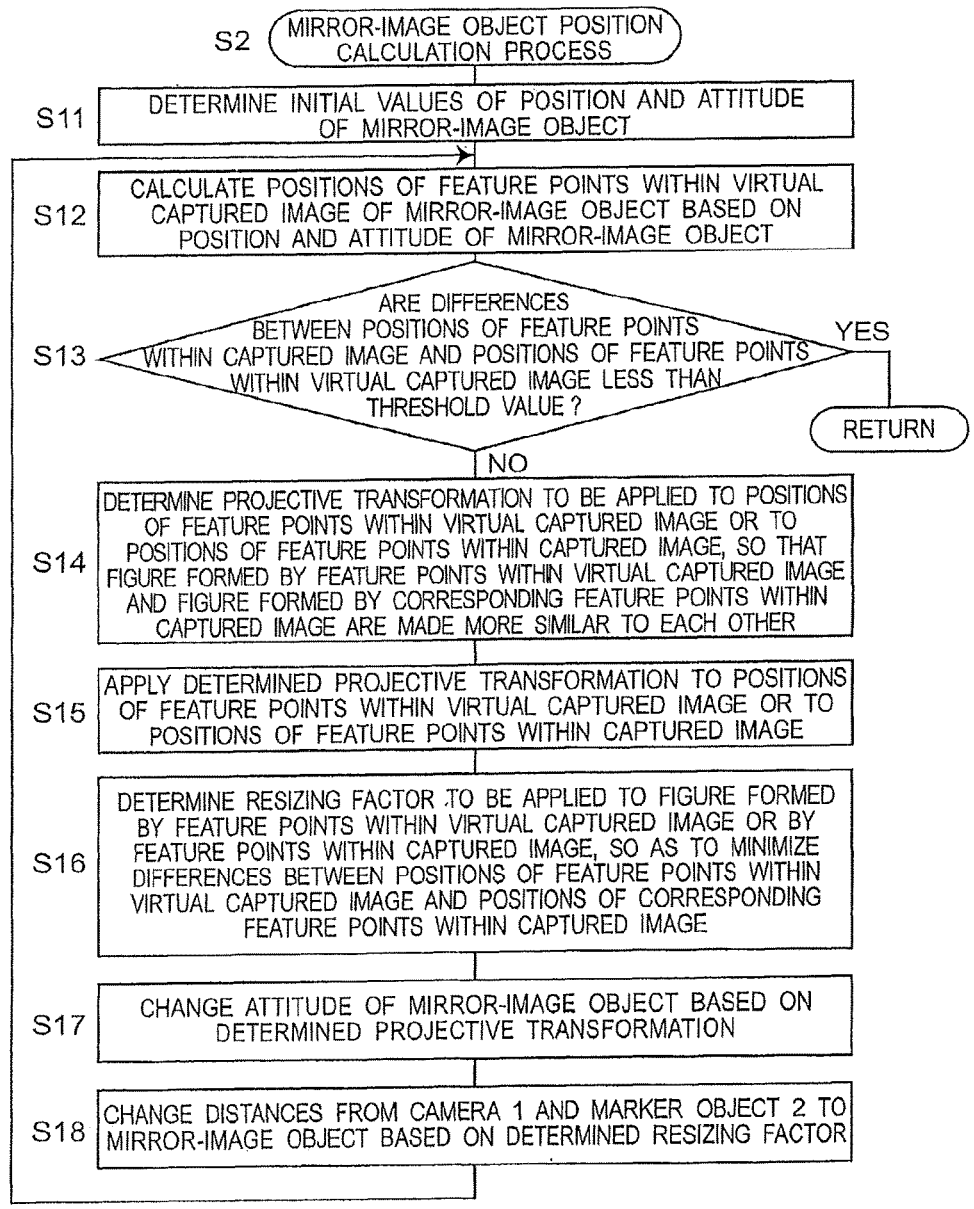
FIG. 5 is a flowchart for explaining a mirror-image object position calculation process in the position measurement process that is executed by the position measurement apparatus according to the first embodiment of the present invention.

With reference to FIGS. 4 and 5, the position measurement process that is executed by the position measurement apparatus according to the first embodiment of the present invention will be described. FIG. 4 is a flowchart for explaining the position measurement process that is executed by the position measurement apparatus according to the first embodiment of the present invention. FIG. 5 is a flowchart for explaining a mirror-image object position calculation process in the position measurement process that is executed by the position measurement apparatus according to the first embodiment of the present invention.

The position of the segmented mirror 21 can be broken down into the position of a predetermined reference point (for example, a centroid) of the segmented mirror 21, a direction in which a predetermined surface of the segmented mirror 21 faces (referred to as a front direction), and a rotation angle around the front direction. With reference to the straight line that is directed from the viewpoint position of the camera 1 to a predetermined point of the segmented mirror 21, a combination of a relative direction of the front direction of the segmented mirror 21 and the rotation angle around the front direction is referred to as an attitude of the segmented mirror 21. When the attitude of the segmented mirror 21 is determined, positions of all portions of the segmented mirror 21 are also determined.

A position of the segmented mirror 21 with respect to the camera 1 is roughly known in advance (for example, with an error of about several tens of centimeters). Therefore, positions of feature points that are included in the virtual captured image are calculated, the virtual captured image being obtained by virtually capturing the camera 1 and the marker object 2 that are reflected in the reflective surface of the segmented mirror 21 to which a rough position and a rough attitude are given. Then, the position and the attitude of the segmented mirror 21 are corrected so that the positions of the feature points within the virtual captured image are close to the positions of the corresponding feature points within the actual captured image. In the first embodiment, the positions of the feature points on the mirror-image object representing the camera 1 and the marker object 2 are calculated in order to calculate the positions of the feature points within the virtual captured image.

Since the positional relationship between the viewpoint of the camera 1 and the segmented mirror 21 is roughly known in advance, the position of the mirror-image object representing the camera 1 and the marker object 2, which is determined according to the rough position of the segmented mirror 21, is referred to as a reference position. In addition, since it is known in advance whether the segmented mirror 21 configures a part of the reflective surface of the reflecting telescope, or the segmented mirror 21 is separated from the reflecting telescope and is placed on a mounting tool, the front direction of the segmented mirror 21 is also roughly known. The attitude of the mirror-image object representing the camera 1 and the marker object 2, which is determined according to the roughly-known front direction of the segmented mirror 21, is referred to as a reference attitude. Since a relative positional relationship of the feature points that are included in the mirror-image object is determined according to the positional relationship among the feature points on the camera 1 and the marker object 2, it is possible to determine the reference position and the reference attitude.

The position measurement process shown in FIG. 4 is executed by the processing device 4 shown in FIG. 1 in order to measure the position of a target object. In step S1, the feature point extracting unit 11 extracts feature points from the actual captured image that is captured by the camera 1, and the feature point extracting unit 11 transmits the information on the extracted feature points to the position measuring unit 12. In step S2, the mirror-image object position calculating unit 13 executes the mirror-image object position calculation process to determine the positions of the feature points on the mirror-image object representing the camera 1 and the marker object 2 (the virtual camera 1M and the virtual marker object 2M).

In step S11 of the flowchart shown in FIG. 5, the mirror-image object position calculating unit 13 determines the reference position and the reference attitude of the mirror-image object representing the camera 1 and the marker object 2, as initial values of the position and the attitude of the mirror-image object. In step S12, the mirror-image object position calculating unit 13 calculates, based on the position and the attitude of the mirror-image object, positions of a plurality of the feature points included in the virtual captured image which is obtained by virtually capturing the mirror-image object under the same capturing conditions as that for obtaining the actual captured image by the camera 1. In step S13, the mirror-image object position calculating unit 13 determines whether or not the differences between the positions of the feature points within the actual captured image and the positions of the corresponding feature points within the virtual captured image are less than the threshold value. When the differences between the feature points are less than the threshold value, that is, when a result of step S13 is YES, the process of the flowchart shown in FIG. 5 ends and proceeds to step S3 shown in FIG. 4. When the differences between the positions of the feature points are equal to or larger than the threshold value, that is, when a result of step S13 is NO, the process proceeds to step S14. The differences between the positions of the feature points are calculated, for example, as a sum of absolute values of distances between the mutually corresponding feature points, a sum of squares of the distances, and the like.

In step S14 shown in FIG. 5, the projective transforming unit 16 in the mirror-image object position calculating unit 13 determines a projective transformation to be applied to the positions of the feature points within the actual captured image or to the positions of the feature points within the virtual captured image, the projective transformation being determined so that, by applying the projective transformation, the figure formed by the feature points within the virtual captured image and the figure formed by the corresponding feature points within the actual captured image are made geometrically more similar to each other. When the reflective surface 22 of the segmented mirror 21 is a plane, the projective transformation based on the positions of all the feature points within the actual captured image (and based on the positions of the corresponding feature points within the virtual captured image), and thus, stably calculate the attitude of the mirror-image object. When the reflective surface 22 of the segmented mirror 21 is a curved surface, it is possible to determine the projective transformation based on the positions of the feature points within a range of the mirror image having an ignorable distortion around the mirror-image center point 35 which is reflected in the actual captured image (and based on the positions of the corresponding feature points within the virtual captured image), and thus, stably calculate the attitude of the mirror-image object, while suppressing influence of the distortion of the mirror image. The points corresponding to the mirror-image center point 35 within the image is referred to as a mirror-image center point within the image.

In step S15 shown in FIG. 5, the determined projective transformation is applied to the positions of the feature points within the actual captured image or to the positions of the feature points within the virtual captured image. Then, in step S16, the resizing unit 17 in the mirror-image object position calculating unit 13 determines a resizing factor to be applied to the figure formed by the feature points within the virtual captured image or formed by the feature points within the actual captured image, the resizing factor being determined so as to minimize the differences between the positions of the feature points within the virtual captured image and the positions of the corresponding feature points within the actual captured image by applying the resizing factor, without changing the positions of the mirror-image center point 35 within the image.

Figure 6:
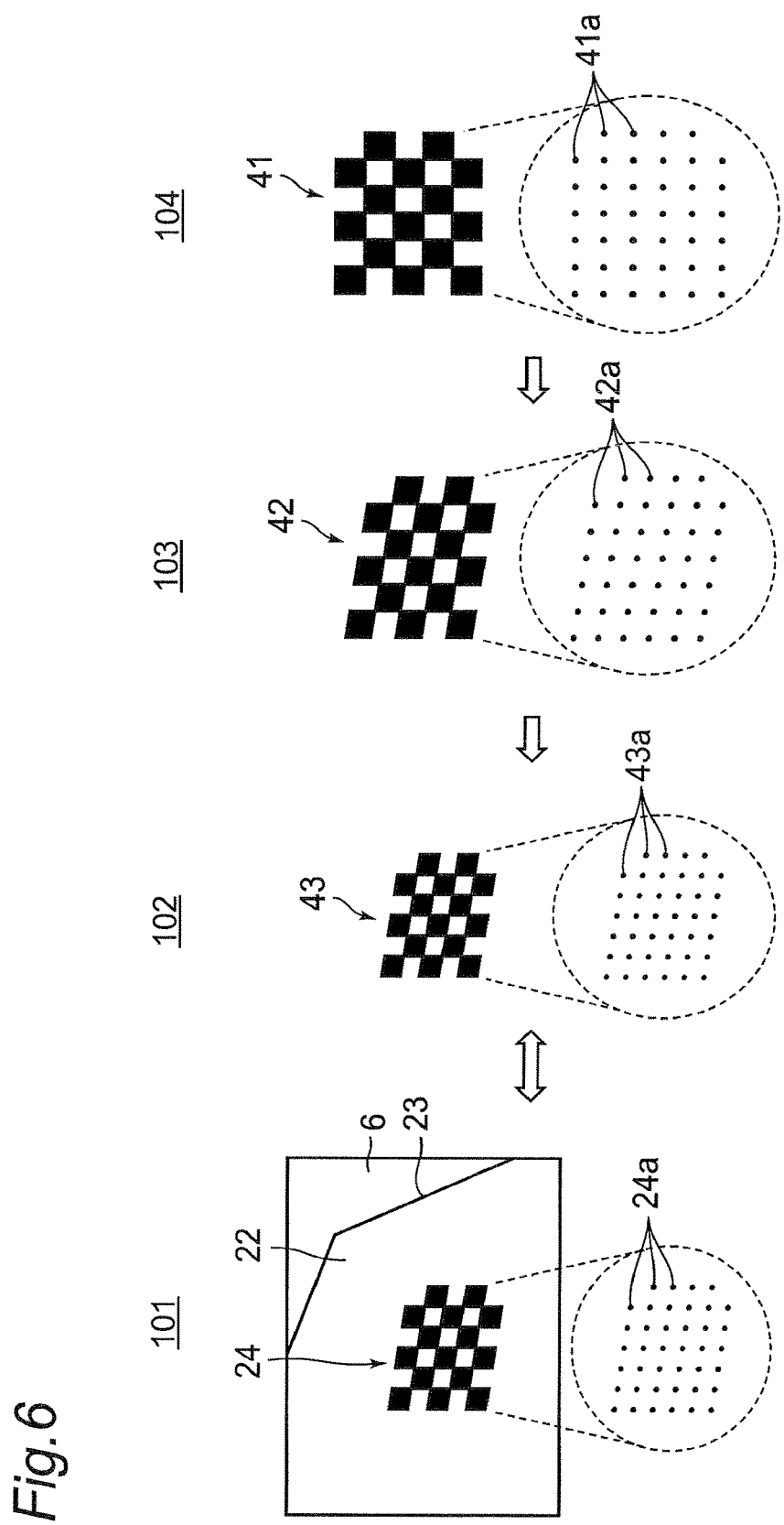
FIG. 6 is a diagram for explaining, by way of example, the process of calculating a position of the mirror-image object by a mirror-image object position calculating unit of the position measurement apparatus according to the first embodiment of the present invention.

FIG. 6 is a diagram for explaining, by way of example, the process of calculating the position of the mirror-image object by the mirror-image object position calculating unit 13 in the position measurement apparatus according to the first embodiment of the present invention. The diagram with a reference sign 101 represents a case where the actual captured image includes the reflective surface 22 and the mirror image 24 of the marker object 2. The mirror image 24 of the marker object 2 has a plurality of feature points 24a. The diagram with a reference sign 104 shows an image 41 of the virtual marker object 2M in the virtual captured image that is obtained by virtually capturing the mirror-image object whose position and attitude are initial values (a reference position and a reference attitude). The image 41 of the virtual marker object 2M has a plurality of feature points 41a. The diagram with a reference sign 103 shows an image 42 of the virtual marker object 2M in the virtual captured image, after applying the projective transformation obtained in step S14 shown in FIG. 5 to the virtual captured image. The image 42 of the virtual marker object 2M has a plurality of feature points 42a. The diagram with a reference sign 102 shows an image 43 of the virtual marker object 2M in the virtual captured image, after resizing the virtual captured image by the resizing factor which is obtained in step S16 shown in FIG. 5. The image 43 of the virtual marker object 2M has a plurality of feature points 43a. In comparing the feature points 41a of the image 41 (see the diagram with the reference sign 104) with the feature points 43a of the image 43 (see the diagram with the reference sign 102), it can be understood that the differences between the positions of the feature points within the actual captured image (see the diagram with the reference sign 101) and the positions of the corresponding feature points within the virtual captured image in the image 43 are reduced than that in the image 41.

In step S17 shown in FIG. 5, the mirror-image object position calculating unit 13 changes the attitude of the mirror-image object, based on the determined projective transformation. In step S18, the mirror-image object position calculating unit 13 changes the distances from the camera 1 and the marker object 2 to the mirror-image object (the virtual camera 1M and the virtual marker object 2M), based on the determined resizing factor.

The mirror-image object position calculating unit 13 may not execute steps S15, S16, and S18, but after executing step S17, may execute the step of directly changing the distances from the camera 1 and the marker object 2 to the mirror-image object (the virtual camera 1M and the virtual marker object 2M) so as to minimize the differences between the positions of the feature points within the actual captured image and the positions of the corresponding feature points within the virtual captured image. This can also be applied to other embodiments.

The mirror-image object position calculating unit 13 repeats steps S12 to S18, until the differences between the positions of the feature points within the actual captured image and the positions of the corresponding feature points within the virtual captured image are less than the threshold value.

In step S3 shown in FIG. 4, the reflective-surface position calculating unit 14 determines a plurality of dividing points that divide the segments connecting between a plurality of feature points on the marker object 2 reflected near the mirror-image center point 35 on the reflective surface 22, and a plurality of the corresponding feature points on the mirror-image object, and the reflective-surface position calculating unit 14 fits an approximate plane 51 to the dividing points. The dividing points exist at positions at which the segments connecting between the feature points on the marker object 2 and the corresponding feature points on the mirror-image object are respectively divided into two parts by a dividing ratio determined according to the curvature radius of the reflective surface 22. The dividing ratio will be described later. In step S4, the reflective-surface position calculating unit 14 determines the position and the orientation of the reflective surface 22 based on the model of the reflective surface 22, so that the reflective surface 22 is tangent to the approximate plane 51 at the mirror-image center point 35. When the reflective surface 22 is a curved surface, the reflective-surface position calculating unit 14 determines the position and the orientation of the approximate plane 51 that approximates the reflective surface 22 near the mirror-image center point 35, and determines the position and the orientation of the reflective-surface model so that the reflective-surface model is tangent to the approximate plane 51 at the mirror-image center point 35. Therefore, the reflective-surface position calculating unit 14 determines the position and the orientation of the reflective surface 22.

The dividing ratio for the dividing points of the segments connecting between the feature points on the marker object 2 and the corresponding feature points on the mirror-image object is derived from the curvature radius of the reflective surface 22 by applying the lens formula. When the reflective surface 22 is a plane, the dividing ratio is 0.5, and the dividing points are on the midpoints of the segments, respectively.

Figure 7:
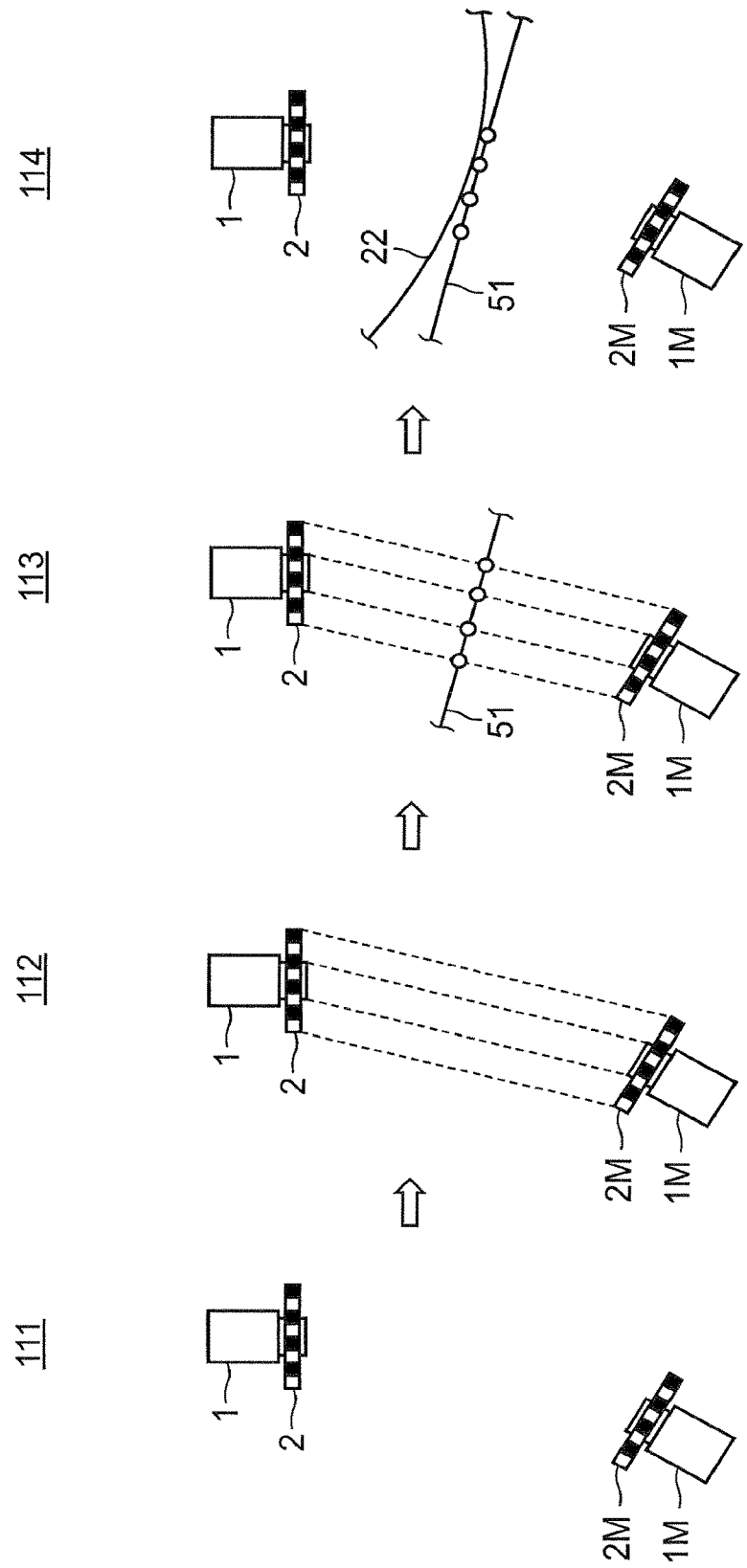
FIG. 7 is a diagram for explaining, by way of example, a process of determining a position and an orientation of the reflective surface of a segmented mirror by a reflective-surface position calculating unit of the position measurement apparatus according to the first embodiment of the present invention.

FIG. 7 is a diagram for explaining, by way of example, a process of determining a position and an orientation of the reflective surface of the segmented mirror by the reflective-surface position calculating unit 14 in the position measurement apparatus according to the first embodiment of the present invention. The diagram with a reference sign 111 shows the camera 1 and the marker object 2, and the virtual camera 1M and the virtual marker object 2M which are the mirror-image object representing the camera 1 and the marker object 2. The diagram with a reference sign 112 shows by dotted lines the segments connecting between the feature points on the camera 1 and the marker object 2, and the corresponding feature points on the virtual camera 1M and the virtual marker object 2M. The diagram with a reference sign 113 shows the dividing points of the segments in the diagram with the reference sign 112, and the approximate plane 51 that is fitted to the dividing points. The diagram with a reference sign 114 shows a position and an orientation of the reflective surface 22 that are determined by determining, as the mirror-image center point, the intersection of the approximate plane 51 and the straight line that passes through the viewpoint of the camera 1 and the viewpoint of the virtual camera 1M, and by fitting the reflective-surface model so that the reflective-surface model coincides with the approximate plane 51 near the mirror-image center point of the reflective surface 22.

In FIG. 7, at first, the camera 1 obtains the captured image that includes the mirror image 24 of the camera 1 and the marker object 2, which is reflected in the reflective surface 22 of the segmented mirror 21 (see the diagram with the reference sign 114), that is, the captured image of the segmented mirror 21 in which a plurality of feature points on the camera 1 and the marker object 2 are reflected within the reflective surface 22. The feature point extracting unit 11 extracts the feature points from the captured image, and determines positions of the feature points within the captured image. The feature point extracting unit 11 further make the positions of the feature points within the captured image correspond to the positions of the feature points that are stored in advance as the feature point data (the actual positions of the feature points on the camera 1 and the marker object 2). The mirror-image object position calculating unit 13 calculates the positions of the feature points that are included in the mirror-image object representing the camera 1 and the marker object 2 (the virtual camera 1M and the virtual marker object 2M). The mirror-image object position calculating unit 13 iteratively correct the attitudes of the virtual camera 1M and the virtual marker object 2M, and iteratively correct the distances from the camera 1 and the marker object 2 to the mirror-image object (the virtual camera 1M and the virtual marker object 2M), so as to reduce the differences between the positions of the feature points within the virtual captured image and the positions of the corresponding feature points within the actual captured image. The mirror-image object position calculating unit 13 can recognize the relative positional relationship among the camera 1 and the marker object 2, and the virtual camera 1M and the virtual marker object 2M, by determining the positions of the feature points on the mirror-image object, as shown in the diagram with the reference sign 112.

As shown in the diagram with the reference sign 113, the reflective-surface position calculating unit 14 calculates the positions of the dividing points between the positions of the plurality of the feature points on the camera 1 and the marker object 2, and the positions of corresponding feature points on the virtual camera 1M and the virtual marker object 2M. The dividing points exist at positions at which the segments connecting between the feature points on the camera 1 and the marker object 2 and the corresponding feature points on the virtual camera 1M and the virtual marker object 2M (see the diagram with the reference sign 112) are divided into two parts by the dividing ratio determined according to the curvature radius of the reflective surface 22.

As shown in the diagram with the reference sign 113, the reflective-surface position calculating unit 14 determines the approximate plane 51 which is a plane approximating the vicinity of the mirror-image center point of the reflective surface 22, by fitting a plane equation to the dividing points. When the reflective surface 22 is a plane, the approximate plane 51 itself is the reflective surface 22. When the reflective surface 22 is a curved surface, the reflective-surface position calculating unit 14 determines the shape of the reflective surface 22 by fitting the reflective-surface model so as to minimize the errors from the reflective-surface model to the approximate plane 51 near the mirror-image center point, as shown in the diagram with the reference sign 114. When the reflective surface 22 is an aspherical curved surface, the position of the reflective surface 22 minutely changes according to which portion of the reflective-surface model is fitted to the approximate plane 51. In this case, when determining the edges 23 of the reflective surface 22, the portion of the reflective-surface model to be fitted is also determined.

Figure 8:
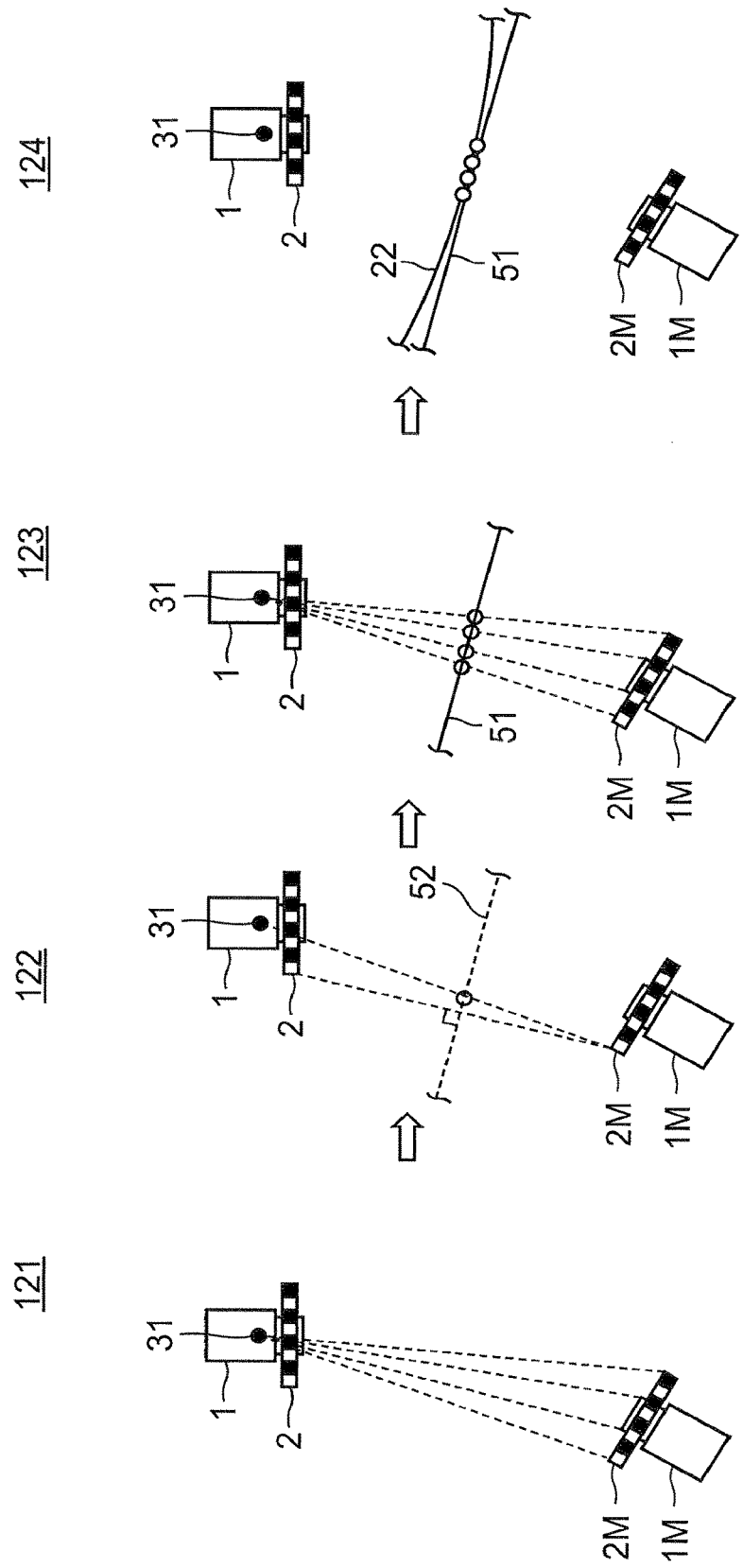
FIG. 8 is a diagram for explaining, by way of example, another process of determining a position and an orientation of the reflective surface of the segmented mirror by the reflective-surface position calculating unit of the position measurement apparatus according to the first embodiment of the present invention.

FIG. 8 is a diagram for explaining, by way of example, another process of determining a position and an orientation of the reflective surface of the segmented mirror by the reflective-surface position calculating unit of the position measurement apparatus according to the first embodiment of the present invention. In the example shown in FIG. 8, a position and an orientation of the reflective surface 22 are determined in consideration of not only the positions of the feature points on the camera 1 and the marker object 2, and the positions of the feature points on the virtual camera 1M and the virtual marker object 2M, but also the position of the viewpoint 31 of the camera 1.

In FIG. 8, the diagram with a reference sign 121 shows by dotted lines the segments connecting between the viewpoint 31 of the camera 1 and the feature points on the virtual camera 1M and the virtual marker object 2M. The diagram with a reference sign 122 is for explaining the method for determining the position of the dividing point in the left-most segment among of the segments connecting between the viewpoint 31 of the camera 1 and the feature points on the virtual camera 1M and the virtual marker object 2M (see the diagram with the reference sign 121). The segments connecting between the feature point on the camera 1 and the marker object 2 and the corresponding feature point on the virtual camera 1M and the virtual marker object 2M (in the diagram with the reference sign 122, the segment connecting between the left-most feature point on the marker object 2 and the left-most feature point on the virtual marker object 2M) are divided into two parts by a predetermined dividing ratio, and a plane 52 that is perpendicular to the segment is determined. The intersections of the plane 52 and the segments, shown in the diagram with the reference sign 121, connecting between the viewpoint 31 and the feature points on the virtual camera 1M and the virtual marker object 2M are obtained as the dividing points of the segments. The diagram with a reference sign 123 is a diagram in which the approximate plane 51 that passes through the dividing points of a plurality of segments in the diagram with the reference sign 121 is obtained near the straight line that passes through the viewpoint of the camera 1 and the viewpoint of the virtual camera 1M. The diagram with a reference sign 124 shows a position and an orientation of the reflective surface 22 that are determined by determining that the mirror-image center point is the intersection of the approximate plane 51 and the straight line passing through the viewpoint of the camera 1 and the viewpoint of the virtual camera 1M, and by fitting the reflective-surface model so that the reflective-surface model coincides with the approximate plane 51 near the mirror-image center point of the reflective surface 22.

It is possible to more accurately determine the position and the orientation of the reflective surface 22 by determining the position and the orientation of the approximate plane 51 according to the method shown in FIG. 8, than the method shown in FIG. 7. It is also possible to determine the position and the orientation of the reflective surface 22 by applying a process similar to this process, to the segments connecting between the virtual viewpoint 31M of the virtual camera 1M and the feature points on the camera 1 and the marker object 2.

When a plane or a curved surface that includes the reflective surface 22 of the segmented mirror 21 is determined by the reflective-surface position calculating unit 14 (the diagram with the reference sign 114 shown in FIG. 7 or the diagram with the reference sign 124 shown in FIG. 8), a plane or a curved surface whose boundary is not determined is being fitted as a surface that includes the reflective surface 22 of the segmented mirror 21. For example, when the segmented mirror 21 is a flat mirror, the direction of normal (the attitude) of the flat mirror is known, but the positions of the edges 23 of the reflective surface 22 (the position of the flat mirror) are unknown. Therefore, the target-object positioning unit 15 determines the position of the segmented mirror 21 which is a target object, by determining the position of the edges 23 of the reflective surface 22.

In step S5 shown in FIG. 4, the target-object positioning unit 15 determines a position of the segmented mirror 21 which is a target object, based on the non-reflective portions of the segmented mirror 21 within the captured image. The target-object positioning unit 15 extracts the non-reflective portions of the segmented mirror 21 from the captured image, in order to determine the position of the target object. In this case, the edges 23 of the reflective surface 22 are used as the non-reflective portions in order to determine the position of the target object. The target-object positioning unit 15 determines straight lines that are directed from the camera 1 to a plurality of points on the edges 23 of the reflective surface 22, based on the positions of the pixels of the edges within the captured image. The target-object positioning unit 15 calculates a position of intersection of the straight lines and a surface including the reflective surface 22 calculated by the reflective-surface position calculating unit 14, and determines the intersections as the points on the edges 23 of the reflective surface 22.

When the reflective surface 22 of the segmented mirror 21 is a curved surface, the target-object positioning unit 15 calculates distances between the points on the edges 23 and the mirror-image center point 35 based on the captured image, calculates position of a point on the reflective surface 22 that correspond to the mirror-image center point 35 based on the calculated distances, and estimates the position and the orientation of the reflective surface 22 based on the reflective-surface model. The target-object positioning unit 15 determines, as positions of the points on the edges 23, the intersections of the reflective surface 22 and the straight lines that are directed from the camera 1 to the points on the edges 23.

In this way, the processing device 4 obtains the mirror-image object corresponding to the mirror image of the camera 1 and the marker object 2 that are reflected in the reflective surface 22 of the segmented mirror 21, and determines the position of the segmented mirror 21 in the three-dimensional space based on the obtained mirror-image object. Therefore, it is possible to determine the position of the target object having a reflective surface in the three-dimensional space, without using a special light source and a wide dynamic-range camera.

According to the first embodiment, in this way, it is possible to calculate the position of the mirror-image object corresponding to the mirror image of the camera 1 and the marker object 2 that are reflected in the reflective surface 22 of the segmented mirror 21, and to estimate the position and the orientation of the reflective surface 22 of the segmented mirror 21 by considering the mirror image transformation relation with the calculated position of the mirror-image object. Accordingly, it is possible to stably measure the position of the segmented mirror 21 in the three-dimensional space, at low cost, by simple adjustment, without using a special light source and a wide dynamic-range camera.

Second Embodiment

In a second embodiment of the present invention, in order to measure a position of a target object, positions of feature points included in a virtual captured image are calculated without using the mirror-image object used in the first embodiment, and a position and an orientation of a reflective surface are calculated so that differences between the positions of feature points within an actual captured image and positions of corresponding feature points within the virtual captured image are less than a predetermined threshold value.

Figure 9:
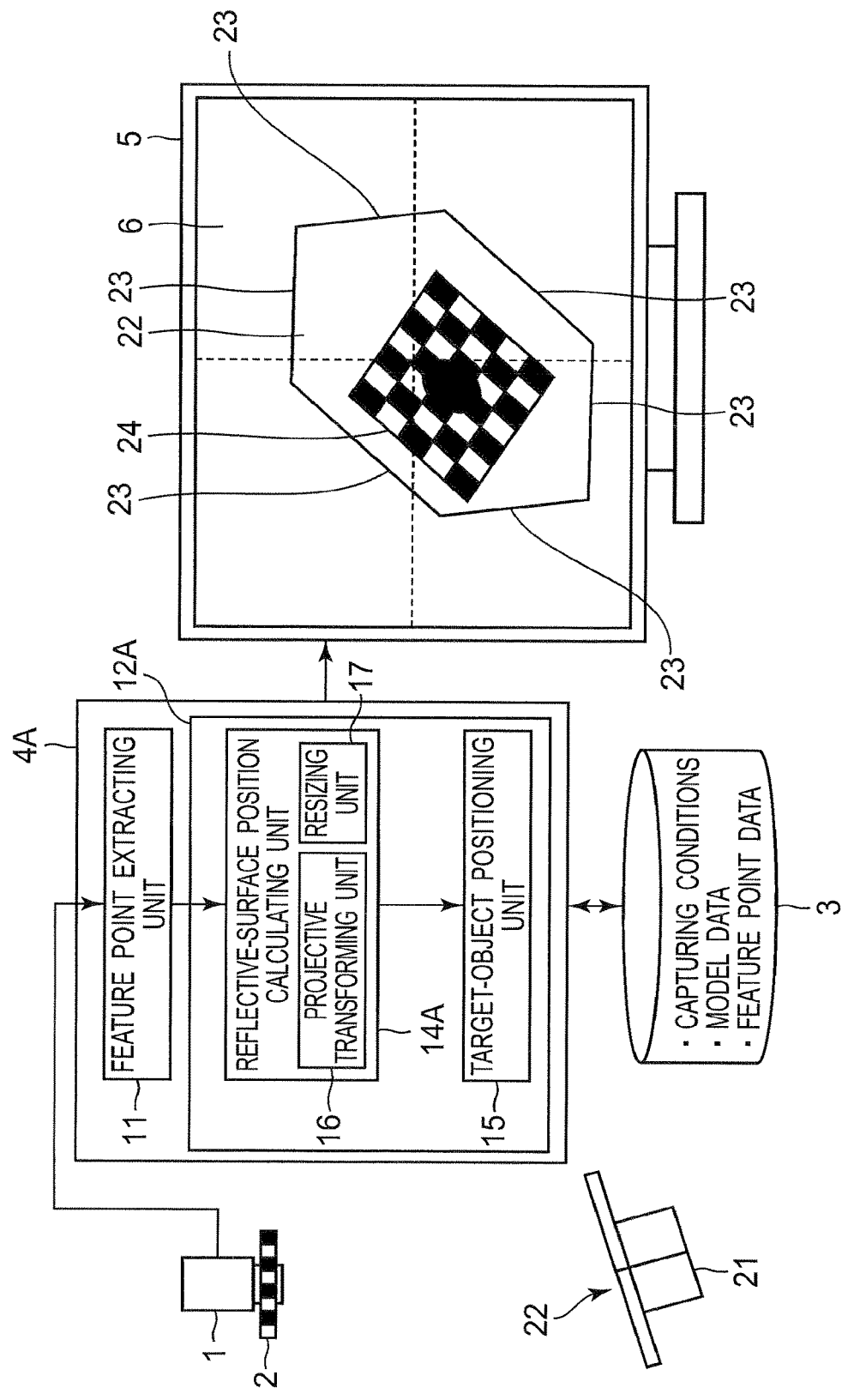
FIG. 9 is a block diagram showing a configuration of a position measurement apparatus according to a second embodiment of the present invention.

FIG. 9 is a block diagram showing a configuration of a position measurement apparatus according to the second embodiment of the present invention. The position measurement apparatus shown in FIG. 9 is provided with a processing device 4A, instead of the processing device 4 shown in FIG. 1. The processing device 4A is provided with a feature point extracting unit 11 and a position measuring unit 12A. The feature point extracting unit 11 in the processing device 4A operates in a manner similar to that of the feature point extracting unit 11 in the processing device 4 shown in FIG.

1. The position measuring unit 12A is provided with a reflective-surface position calculating unit 14A and a target-object positioning unit 15. The reflective-surface position calculating unit 14A calculates a position and an orientation of a reflective surface 22, by iteratively correcting a position and an orientation of a virtually determined reflective surface, based on a shape of the reflective surface 22 stored in advance as model data, and based on positions of feature points stored in advance as feature point data. At this time, the reflective-surface position calculating unit 14A obtains a virtual captured image by virtually capturing the camera 1 and a marker object 2 that are virtually reflected in the reflective surface having the virtually determined position and orientation, under the same capturing conditions as that for obtaining the actual captured image by the camera 1, and calculates positions of a plurality of the feature points included in the virtual captured image. Then, the reflective-surface position calculating unit 14A calculates the position and the orientation of the reflective surface 22 so that the positions of the plurality of the feature points included in the virtual captured image are close to positions of the plurality of the corresponding feature points within the captured image. The target-object positioning unit 15 determines the position of the segmented mirror 21, based on the positional relationship among the reflective surface and non-reflective portions that are stored in advance as model data, and based on the position and the orientation of the reflective surface 22 calculated by the reflective-surface position calculating unit 14A.

Specifically, the reflective-surface position calculating unit 14A virtually determines the position and the orientation of the reflective surface 22, and calculates the actual position and orientation of the reflective surface 22, using the reflective surface that has the virtually determined position and orientation (referred to as a virtual reflective surface). The reflective-surface position calculating unit 14A obtains a virtual captured image in which the camera 1 and the marker object 2 are virtually reflected in the virtual reflective surface by virtually capturing the camera 1 and the marker object 2 that are reflected in the virtual reflective surface, and calculates the positions of feature points included in the virtual captured image. The reflective-surface position calculating unit 14A iteratively corrects the virtually determined position and orientation of the reflective surface 22 so that differences between the positions of the feature points within the virtual captured image and the positions of the corresponding feature points within the actual captured image are less than a threshold value.

The reflective-surface position calculating unit 14A iteratively corrects the position and the orientation of the virtual reflective surface so that the positions of a plurality of the feature points included in the virtual captured image obtained by virtually capturing the mirror image of the camera 1 and the marker object 2 virtually reflected in the virtual reflective surface under the same capturing conditions as that for obtaining the actual captured image by the camera 1 are close to the plurality of the corresponding feature points within the actual captured image.

The reflective-surface position calculating unit 14A calculates by changing the position and the orientation of the virtual reflective surface so as to reduce the differences between the positions of the feature points within the virtual captured image and the positions of the corresponding feature points within the actual captured image. The reflective-surface position calculating unit 14A is provided with a projective transforming unit 16 and a resizing unit 17. The projective transforming unit 16 and the resizing unit 17 in the reflective-surface position calculating unit 14A operate in a manner similar to that of the projective transforming unit 16 and the resizing unit 17 in the mirror-image object position calculating unit 13 shown in FIG. 1. The reflective-surface position calculating unit 14A changes the position and the orientation of the virtual reflective surface, based on a projective transformation determined by the projective transforming unit 16, and based on a resizing factor determined by the resizing unit 17.

Figure 10:
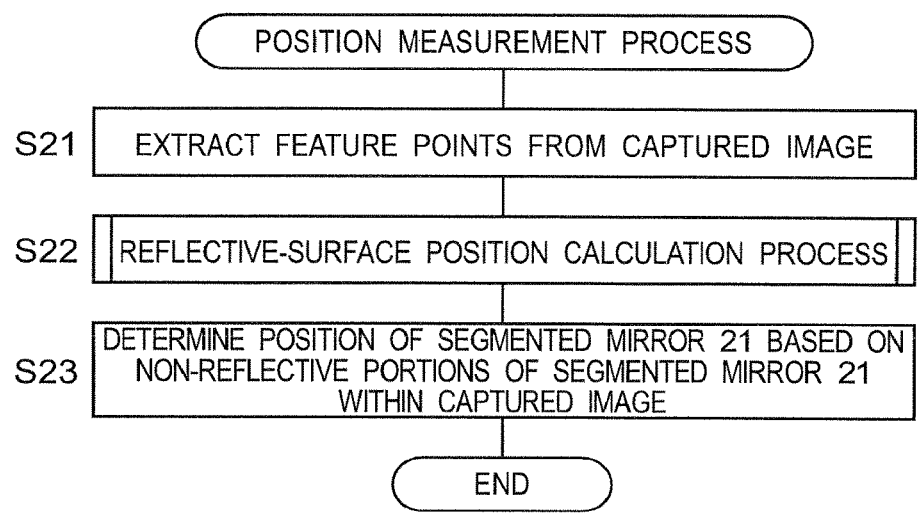
FIG. 10 is a flowchart for explaining a position measurement process that is executed by a position measurement apparatus according to the second embodiment of the present invention.
Figure 11:
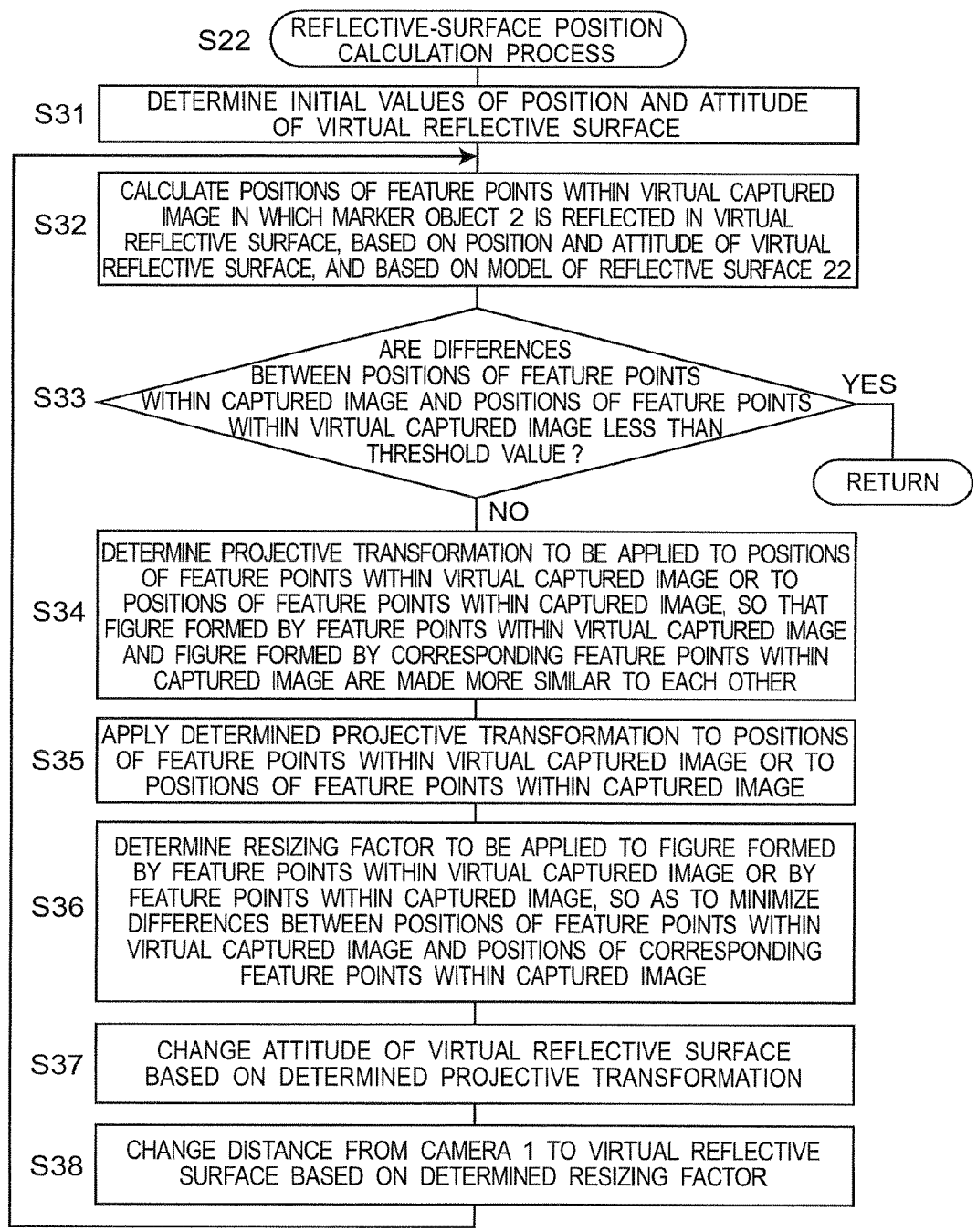
FIG. 11 is a flowchart for explaining a reflective-surface position calculation process in the position measurement process that is executed by the position measurement apparatus according to the second embodiment of the present invention.

With reference to FIGS. 10 and 11, a position measurement process that is executed by the position measurement apparatus according to the second embodiment of the present invention will be described. FIG. 10 is a flowchart for explaining the position measurement process that is executed by the position measurement apparatus according to the second embodiment of the present invention. FIG. 11 is a flowchart for explaining a reflective-surface position calculation process in the position measurement process that is executed by the position measurement apparatus according to the second embodiment of the present invention.

The position measurement process shown in FIG. 10 is executed by the processing device 4A shown in FIG. 9 in order to measure the position of a target object. In step S21, the feature point extracting unit 11 extracts feature points from the actual captured image that is captured by the camera 1, and the feature point extracting unit 11 transmits the information on the extracted feature points to the position measuring unit 12A. In step S22, the reflective-surface position calculating unit 14A calculates the position and the orientation of the reflective surface 22, by executing the reflective-surface position calculation process to calculate the position and the orientation of the virtual reflective surface.

In step S31 shown in FIG. 11, the reflective-surface position calculating unit 14A determines initial values of the position and the orientation of the virtual reflective surface. In step S32, the reflective-surface position calculating unit 14A calculates the positions of the feature points within the virtual captured image in which the marker object 2 is reflected in the virtual reflective surface, based on the position and the orientation of the virtual reflective surface, and based on the model of the reflective surface 22. In step S33, the reflective-surface position calculating unit 14A determines whether or not the differences between the positions of the feature points within the captured image and the positions of the corresponding feature points within the virtual captured image are less than the threshold value. When the differences between the feature points are less than the threshold value, that is, when a result of step S33 is YES, the process of the flowchart shown in FIG. 11 ends and proceeds to step S23 shown in FIG. 10. When the differences between the positions of the feature points are equal to or larger than the threshold value, that is, when a result of step S33 is NO, the process proceeds to step S34.

In step S34, the projective transforming unit 16 in the reflective-surface position calculating unit 14A determines a projective transformation to be applied to the positions of the feature points within the actual captured image or to the positions of the feature points within the virtual captured image, the projective transformation being determined so that, by applying the projective transformation, the figure formed by the feature points within the virtual captured image and the figure formed by the corresponding feature points within the actual captured image are made geometrically more similar to each other. In step S35 shown in FIG. 11, the determined projective transformation is applied to the positions of the feature points within the actual captured image or to the positions of the feature points within the virtual captured image. Then, in step S36, the resizing unit 17 in the reflective-surface position calculating unit 14A determines a resizing factor to be applied to the figure formed by the feature points within the virtual captured image or formed by the feature points within the actual captured image, the resizing factor being determined so as to minimize the differences between the positions of the feature points within the virtual captured image and the positions of the corresponding feature points within the actual captured image by applying the resizing factor, without changing the positions of the mirror-image center point 35 within the image.

In step S37, the reflective-surface position calculating unit 14A changes the orientation of the virtual reflective surface, based on the determined projective transformation. In step S38, the reflective-surface position calculating unit 14A changes the distance from the camera 1 to the virtual reflective surface, based on the determined resizing factor.

The reflective-surface position calculating unit 14A repeats steps S32 to S38, until the differences between the positions of the feature points within the actual captured image and the positions of the corresponding feature points within the virtual captured image are less than the threshold value. The reflective-surface position calculating unit 14A obtains the position and the orientation of the reflective surface 22 by iterative calculation.

In step S23 shown in FIG. 10, the target-object positioning unit 15 determines positions of edges 23 of the reflective surface 22 based on the non-reflective portions of the segmented mirror 21 within the captured image, and thus determines the position of the segmented mirror 21 which is a target object.

While the position of the mirror-image object is iteratively calculated in the first embodiment, the position and the orientation of the virtual reflective surface are iteratively calculated in the second embodiment.

In this way, the processing device 4A determines the position of the segmented mirror 21 in the three-dimensional space, based on the virtual captured image obtained by virtually capturing the camera 1 and the marker object 2 that are virtually reflected in the virtual reflective surface. Therefore, it is possible to determine the position of the target object having a reflective surface in the three-dimensional space, without using a special light source and a wide dynamic-range camera.

Third Embodiment

In a third embodiment of the present invention, even when a curvature radius of a reflective surface is unknown, a position, an orientation, and a curvature radius of a reflective surface are calculated so that differences between the positions of feature points within an actual captured image and positions of corresponding feature points within a virtual captured image are less than a predetermined threshold value. In other aspects, the third embodiment is similar to the second embodiment.

Figure 12:
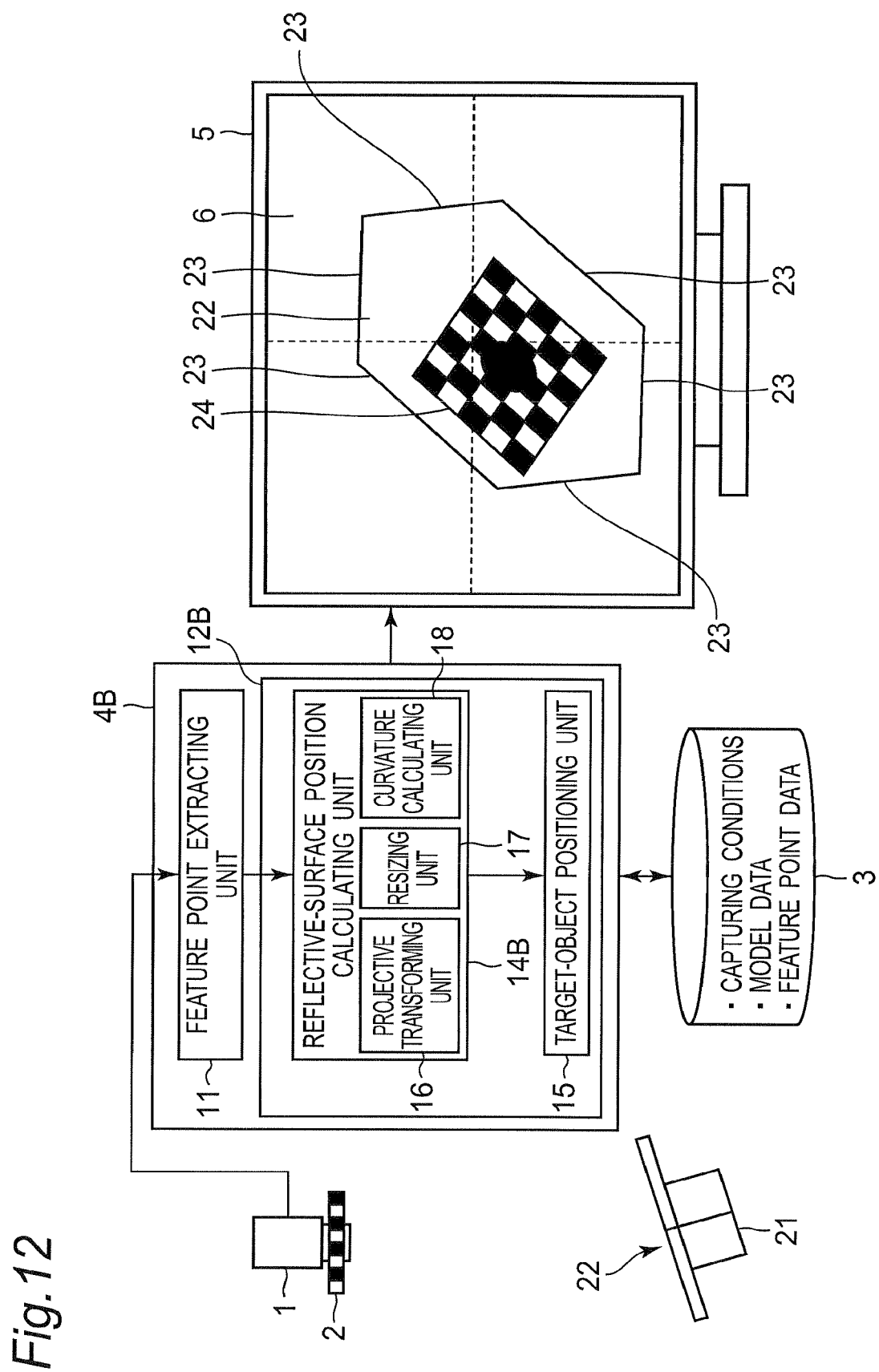
FIG. 12 is a block diagram showing a configuration of a position measurement apparatus according to a third embodiment of the present invention.

FIG. 12 is a block diagram showing a configuration of a position measurement apparatus according to the third embodiment of the present invention. The position measurement apparatus shown in FIG. 12 is provided with a processing device 4B, instead of the processing device 4A shown in FIG. 9. The model data stored in the storage device 3 includes the shape of a reflective surface 22 not including a curvature radius, and includes a positional relationship among the reflective surface and the non-reflective portions.

The processing device 4B is provided with a feature point extracting unit 11 and a position measuring unit 12B. The feature point extracting unit 11 in the processing device 4B operates in a manner similar to that of the feature point extracting unit 11 in the processing device 4 shown in FIG. 1.

The position measuring unit 12B is provided with a reflective-surface position calculating unit 14B and a target-object positioning unit 15. The reflective-surface position calculating unit 14B calculates a position, an orientation, and a curvature radius of the reflective surface 22, by calculating a position, an orientation, and a curvature radius of a virtual reflective surface that virtually reflects a camera 1 and a marker object 2, based on the shape of the reflective surface 22 stored in advance as model data, and based on positions of feature points stored in advance as feature point data. The reflective-surface position calculating unit 14B obtains a virtual captured image by virtually capturing the camera 1 and the marker object 2 that are virtually reflected in the reflective surface, under the same capturing conditions as that for obtaining the actual captured image by the camera 1 and calculates positions of a plurality of the feature points included in the virtual captured image. Then, the reflective-surface position calculating unit 14B calculates the position, the orientation, and the curvature radius of the virtual reflective surface so that the positions of the plurality of the feature points included in the virtual captured image are close to positions of the plurality of the corresponding feature points within the actual captured image. The target-object positioning unit 15 determines the position of the segmented mirror 21, based on the positional relationship among the reflective surface and non-reflective portions that are stored in advance as model data, and based on the position and the orientation of the reflective surface 22 calculated by the reflective-surface position calculating unit 14B.

The reflective-surface position calculating unit 14B calculates by changing the position, the orientation, and the curvature radius of the virtual reflective surface, so as to reduce the differences between the positions of the feature points within the virtual captured image and the positions of the corresponding feature points within the actual captured image. The reflective-surface position calculating unit 14B is provided with a projective transforming unit 16, a resizing unit 17, and a curvature calculating unit 18. The projective transforming unit 16 and the resizing unit 17 in the reflective-surface position calculating unit 14B operate in a manner similar to that of the projective transforming unit 16 and the resizing unit 17 in the mirror-image object position calculating unit 13 shown in FIG. 1. The curvature calculating unit 18 estimates the curvature radius of the reflective surface 22, based on differences between the positions of three or more feature points within the captured image and the positions of corresponding feature points within the virtual captured image, and also based on distances from a mirror-image center point 35 within the captured image or within the virtual captured image to the feature points within the actual captured image or to the feature points within the virtual captured image. The differences between the positions of the feature points within the actual captured image and the positions of the corresponding feature points within the virtual captured image are determined according to a difference between an estimated curvature radius and an actual curvature radius of the reflective surface 22. The reflective-surface position calculating unit 14B changes the position, the orientation, and the curvature radius of the virtual reflective surface, based on the projective transformation determined by the projective transforming unit 16, the resizing factor determined by the resizing unit 17, and the curvature radius calculated by the curvature calculating unit 18.

Figure 13:
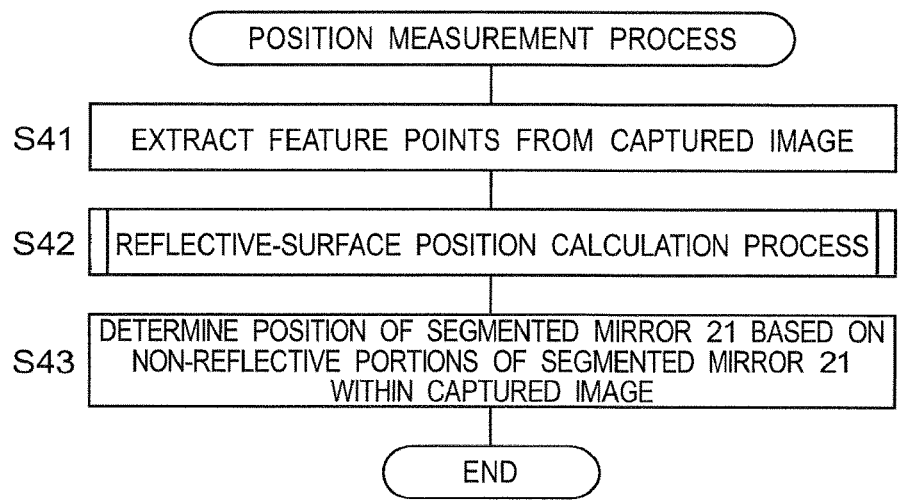
FIG. 13 is a flowchart for explaining a position measurement process that is executed by the position measurement apparatus according to the third embodiment of the present invention.
Figure 14:
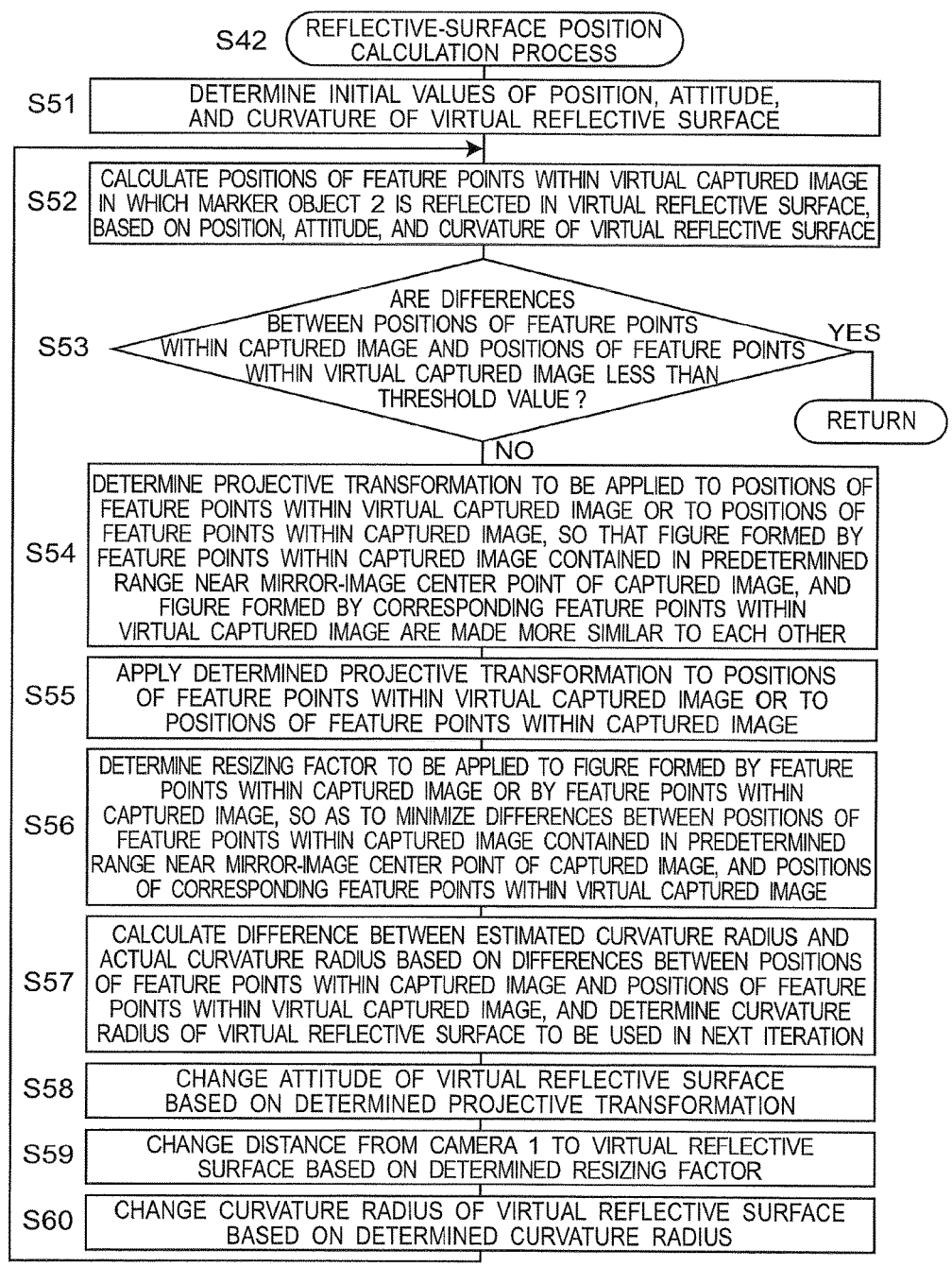
FIG. 14 is a flowchart for explaining a reflective-surface position calculation process in the position measurement process that is executed by the position measurement apparatus according to the third embodiment of the present invention.

With reference to FIGS. 13 and 14, a position measurement process that is executed by the position measurement apparatus according to the third embodiment of the present invention will be described. FIG. 13 is a flowchart for explaining the position measurement process that is executed by the position measurement apparatus according to the third embodiment of the present invention. FIG. 14 is a flowchart for explaining the reflective-surface position calculation process in the position measurement process that is executed by the position measurement apparatus according to the third embodiment of the present invention.

The position measurement process shown in the flowchart as FIG. 13 is executed by the processing device 4B shown in FIG. 12 in order to measure the position of a target object. In step S41, the feature point extracting unit 11 extracts feature points from the actual captured image that is captured by the camera 1, and the feature point extracting unit 11 transmits the information on the extracted feature points to the position measuring unit 12B. In step S42, the reflective-surface position calculating unit 14B calculates the position, the orientation, and the curvature radius of the reflective surface 22, by executing the reflective-surface position calculation process to calculate the position, the orientation, and the curvature radius of the virtual reflective surface.

In step S51 shown in FIG. 14, the reflective-surface position calculating unit 14B determines initial values of the position, the orientation, and the curvature radius of the virtual reflective surface. In step S52, the reflective-surface position calculating unit 14B calculates the positions of the feature points within the virtual captured image in which the marker object 2 is reflected in the virtual reflective surface, based on the position, the orientation, and the curvature radius of the virtual reflective surface. In step S53, the reflective-surface position calculating unit 14B determines whether or not the differences between the positions of the feature points within the captured image and the positions of the corresponding feature points within the virtual captured image are less than the threshold value. When the differences between the feature points are less than the threshold value, that is, when a result of step S53 is YES, the process of the flowchart shown in FIG. 14 ends and proceeds to step S43 shown in FIG. 13. When the differences between the positions of the feature points are equal to or larger than the threshold value, that is, when a result of step S53 is NO, the process proceeds to step S54.

In step S54, the projective transforming unit 16 in the reflective-surface position calculating unit 14B determines a projective transformation to be applied to the positions of the feature points within the captured image or to the positions of the feature points within the virtual captured image, the projective transformation being determined so that, by applying the projective transformation, the figure formed by the feature points within the actual captured image included in a predetermined range near the mirror-image center point 35 within the actual captured image and the figure formed by the corresponding feature points within the virtual captured image are made geometrically more similar to each other. In step S55, the obtained projective transformation is applied to the positions of the feature points within the actual captured image or to the positions of the feature points within the virtual captured image. Then, in step S56, the resizing unit 17 in the reflective-surface position calculating unit 14B determines a resizing factor to be applied to the figure formed by the feature points within the virtual captured image or formed by the feature points within the actual captured image, the resizing factor being determined so as to minimize the differences between the positions of the feature points within the actual captured image included in a predetermined range near the mirror-image center point 35 within the actual captured image, and the positions of the corresponding feature points within the virtual captured image by applying the resizing factor. The predetermined range near the mirror-image center point 35 within the image to be used to obtain the resizing factor is determined so that a sufficient number of feature points are included in the range, and so that the differences between the positions of the feature points within the actual captured image and the positions of the corresponding feature points within the virtual captured image due to the curvature of the reflective surface 22 are small enough.

In step S57, the curvature calculating unit 18 in the reflective-surface position calculating unit 14B calculates the difference between the estimated curvature radius and the actual curvature radius, based on the differences between the positions of the feature points within the captured image and the positions of the corresponding feature points within the virtual captured image, and determines the curvature radius of the virtual reflective surface to be used in the next iteration.

Figure 15:
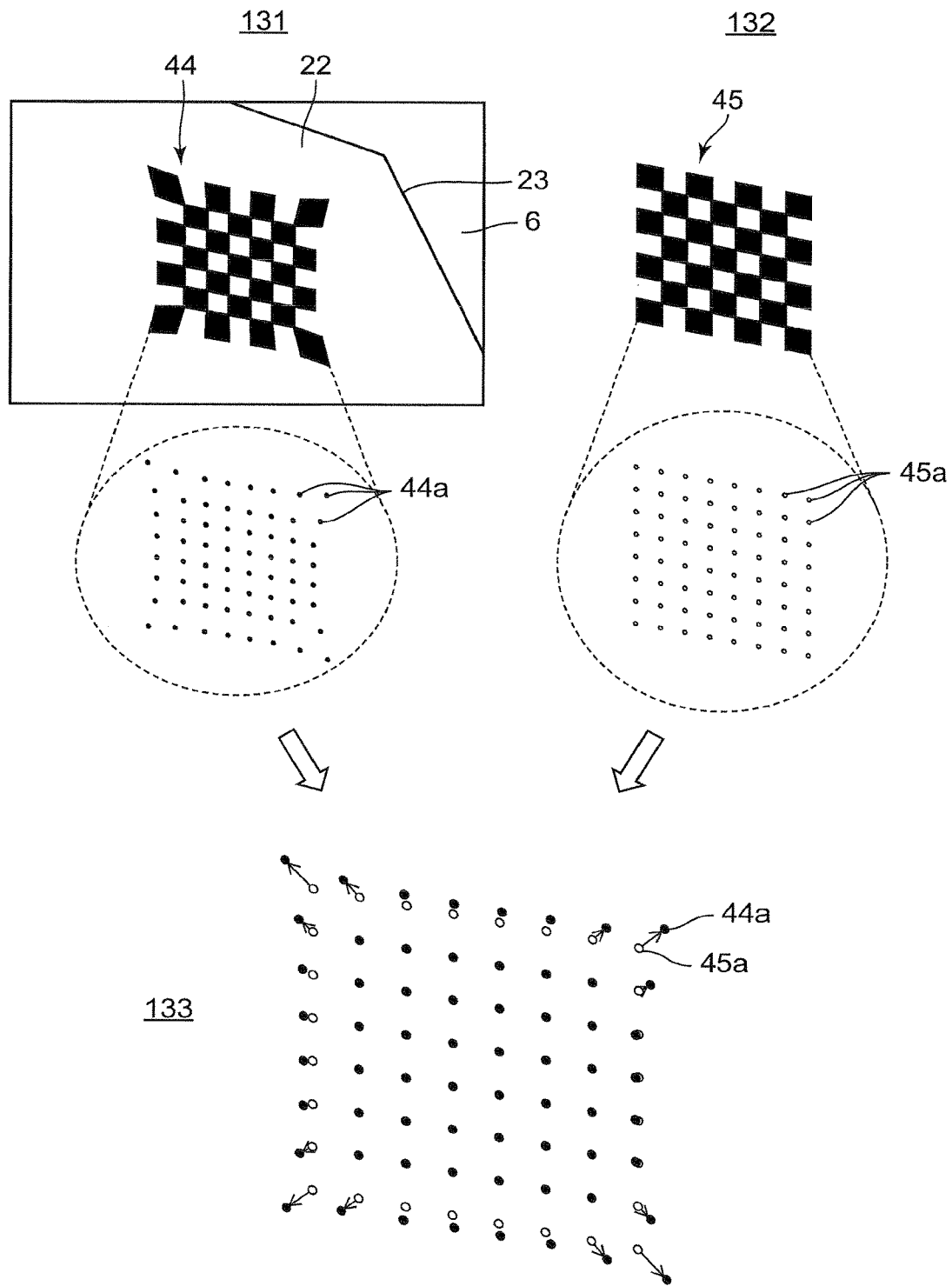
FIG. 15 is a diagram for explaining, by way of example, the principle of estimating a curvature radius of a reflective surface by a curvature calculating unit of the position measurement apparatus according to the third embodiment of the present invention.

FIG. 15 is a diagram for explaining, by way of example, the principle of estimating the curvature radius of the reflective surface by the curvature calculating unit 18 in the position measurement apparatus according to the third embodiment of the present invention. The diagram with a reference sign 131 shows a case where the reflective surface 22 is a curved surface, and the reflective surface 22 and a mirror image 44 of the marker object 2 are reflected in the actual captured image. The mirror image 44 of the marker object 2 has a plurality of feature points 44a. The diagram with a reference sign 132 shows an image 45 of the marker object 2 in the virtual captured image after applying the projective transformation determined in step S54 shown in FIG. 14 and the resizing factor determined in step S55 shown in FIG. 14. The image 45 of the marker object 2 includes a plurality of feature points 45a. The diagram with the reference sign 132 shows positions of the feature points 45a that are included in the virtual captured image obtained by virtually capturing the marker object 2 virtually reflected in a flat reflective mirror, under a predetermined capturing conditions. The diagram with a reference sign 133 shows differences between the positions of the feature points 44a of the reference sign 131, denoted by black circles, and the positions of the feature points 45a of the reference sign 132, denoted by white circles.

When an actual straight line is reflected in the curved reflective surface 22, the actual straight line reflected as the mirror image 24 on the reflective surface 22 at the portion far from the mirror-image center point 35 of the mirror image 24 is reflected as a curved line. When the straight line is reflected in the curved surface, the angle difference between paths directed from the viewpoint position to both ends of the straight line reflected in the reflective surface 22 varies according to the curvature radius of the reflective surface 22, as compared to an angle difference obtained when the straight line is reflected by the flat mirror. For example, when the curved surface is concaved, the angle difference becomes larger as the curvature radius becomes smaller, as compared to the case in which the straight line is reflected by the flat mirror. Because there is such nonlinearity that the angle difference increases at a larger rate as the point on the straight line reflected in the reflective surface 22 becomes farther from the mirror-image center point, the straight line is reflected to be curved.

It is possible to estimate the curvature radius of the reflective surface 22 based on the degree of curvature of the curved line in the mirror image of the actual straight line reflected in the curved surface. The positions of the feature points to which both the projective transformation determined in step S54 shown in FIG. 14 and the resizing factor determined in step S55 shown in FIG. 14 are applied have distortions which are caused by the estimated curvature radius for the reflective surface 22. The differences between the positions of all the feature points 44a within the actual captured image, and the positions of the corresponding feature points 45a within the virtual captured image after applying the determined projective transformation and the determined resizing factor are determined in accordance with the difference between the estimated curvature radius and the actual curvature radius for the reflective surface 22 which is a curved surface, and in accordance with the distances from the mirror-image center point 35 within the actual captured image or within the virtual captured image to the positions of the feature points. Therefore, it is possible to estimate the curvature radius of the reflective surface 22, based on the differences between the positions of the feature points 44a within the actual captured image and the positions of the corresponding feature points 45a within the virtual captured image, and based on the distances from the mirror-image center point 35 within the actual captured image or within the virtual captured image to the positions of the feature points 44a or to the feature points 45a. The curvature radius is calculated based on the ratio of distances on the image between the mirror-image center point 35 in the captured image or in the virtual captured image and the feature points, to the differences (deviations) between the positions of the feature points for the distances. The distances from the mirror-image center point 35 within the actual captured image or within the virtual captured image, and the differences of the positions of the feature points are represented by the number of pixels existing in the distance or in the difference of the positions, and by the angle difference formed by the straight lines from the viewpoint position of the camera. An amount of correction for obtaining the curvature radius to be used in the next iteration may be calculated by weighting and averaging a plurality of curvature radiuses obtained by a plurality of feature points.

In step S58 shown in FIG. 14, the reflective-surface position calculating unit 14B changes the direction of the virtual reflective surface, based on the determined projective transformation. In step S59, the reflective-surface position calculating unit 14B changes the distance from the camera 1 to the virtual reflective surface, based on the determined resizing factor. In step S60, the reflective-surface position calculating unit 14B changes the curvature radius of the virtual reflective surface, based on the determined curvature radius.

The reflective-surface position calculating unit 14B repeats steps S52 to S60 until the differences between the positions of the feature points within the actual captured image and the positions of the corresponding feature points within the virtual captured image are less than the threshold value. The reflective-surface position calculating unit 14B obtains the position, the orientation, and the curvature radius of the reflective surface 22 by iterative calculation.

In step S43 shown in FIG. 13, the target-object positioning unit 15 determines positions of edges 23 of the reflective surface 22 based on the non-reflective portions of the segmented mirror 21 within the captured image, and thus, determines the position of the segmented mirror 21 which is a target object.

The curvature radius of the reflective surface 22 may be determined to have different values in different directions. The reflective surface 22 may be modeled so that the curvature radius changes according to a predetermined equation dependent on the position within the reflective surface 22. The reflective surface 22 may be represented by a numerical expression for a paraboloid or a hyperboloid, etc., and parameters used in the numerical expression may be changed.

In this way, the processing device 4B determines the position of the segmented mirror 21 in the three-dimensional space, based on the virtual captured image obtained by virtually capturing the camera 1 and the marker object 2 that are virtually reflected in the virtual reflective surface. Therefore, it is possible to determine the position of the target object having a reflective surface in the three-dimensional space, without using a special light source and a wide dynamic-range camera.

Fourth Embodiment

In a fourth embodiment of the present invention, a position and an attitude of a reflective surface having a known shape and having different curvature radiuses for different directions is determined.

Figure 16:
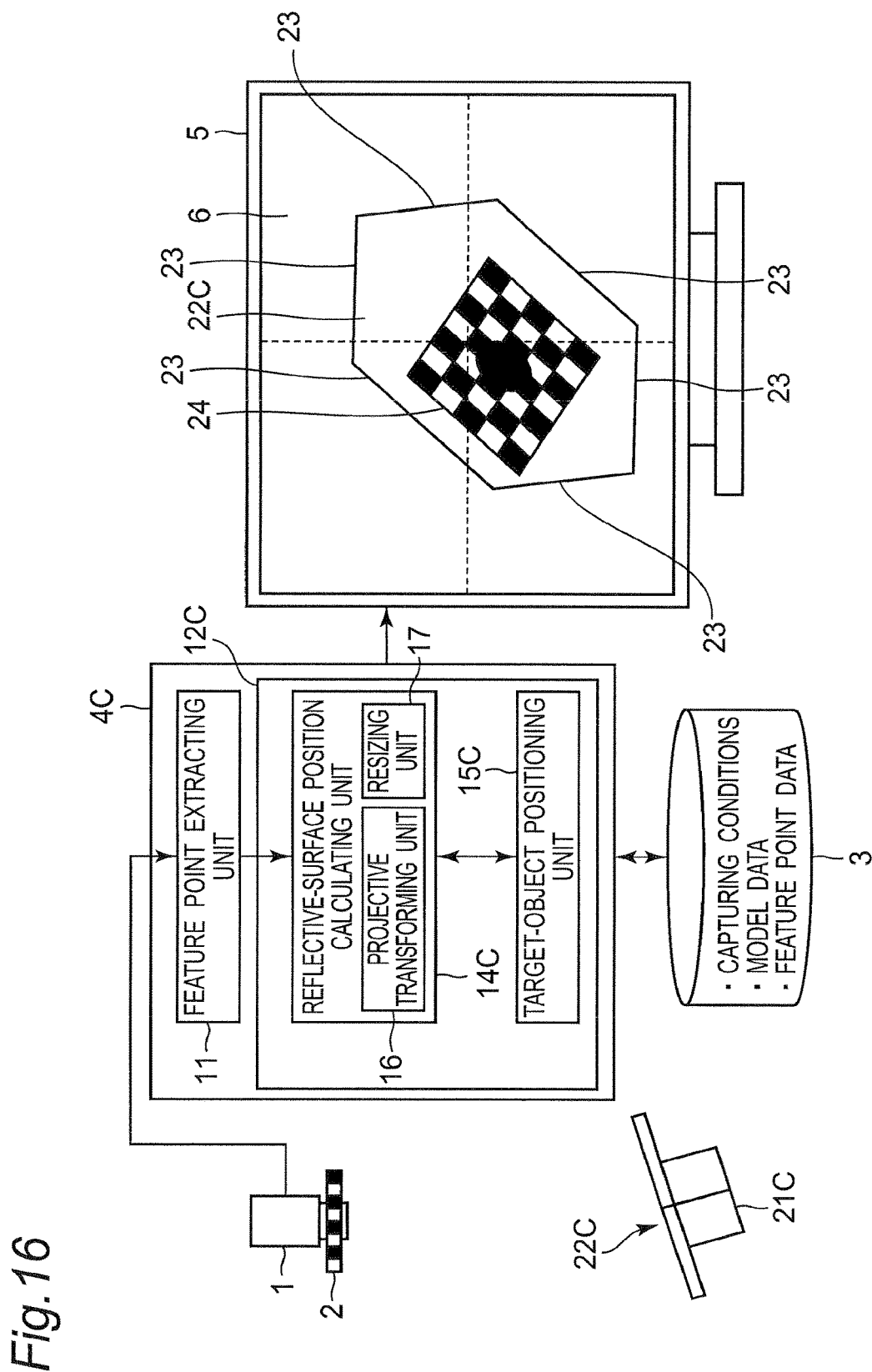
FIG. 16 is a block diagram showing a configuration of a position measurement apparatus according to a fourth embodiment of the present invention.

FIG. 16 is a block diagram showing a configuration of a position measurement apparatus according to a fourth embodiment of the present invention. It is assumed that a reflective surface 22C of a segmented mirror 21C can be approximated by combination of a spherical surface and a cylindrical surface, each of the spherical surface and the cylindrical surface being concaved when seen from a camera 1. In the reflective surface 22C of the segmented mirror 21C, the direction in which amount of concave is maximum and constant in the cylindrical surface is the direction having maximum curvature radius, that is, the direction having minimum curvature. Therefore, the direction in which amount of concave is constant in the cylindrical surface is referred to as a minimum curvature direction. For example, in the reflective surface 22C shown in a display device 5 shown in FIG. 16, a direction of a diagonal line from the upper right corner to the left lower corner is considered as a minimum curvature direction of the reflective surface 22C. The attitude of the reflective surface 22C also includes the information about in which direction the minimum curvature direction is oriented.

The position measurement apparatus shown in FIG. 16 is provided with a processing device 4C, instead of the processing device 4 shown in FIG. 1. The processing device 4C is provided with a feature point extracting unit 11 and a position measuring unit 12C. The feature point extracting unit 11 in the processing device 4C operates in a manner similar to that of the feature point extracting unit 11 in the processing device 4 shown in FIG. 1. The position measuring unit 12C is provided with a reflective-surface position calculating unit 14C and a target-object positioning unit 15C. The reflective-surface position calculating unit 14C calculates a position and an attitude of the reflective surface 22C, by calculating a position and an attitude of a virtual reflective surface that virtually reflects a camera 1 and a marker object 2, based on a shape of the reflective surface 22C stored in advance as model data, and based on positions of feature points stored in advance as feature point data. The reflective-surface position calculating unit 14C calculates positions of a plurality of the feature points included in a virtual captured image obtained by virtually capturing the camera 1 and the marker object 2 that are virtually reflected in the reflective surface, under the same capturing conditions as that for obtaining the actual captured image by the camera 1. Then, the reflective-surface position calculating unit 14C calculates the position and the attitude of the virtual reflective surface so that the positions of the plurality of the feature points included in the virtual captured image are close to positions of the plurality of the corresponding feature points within the actual captured image. The target-object positioning unit 15C determines the minimum curvature direction of the reflective surface 22C, and further determines the position of the segmented mirror 21, based on the positional relationship among the reflective surface and non-reflective portions that are stored in advance as model data, and based on the position and the attitude of the reflective surface 22C calculated by the reflective-surface position calculating unit 14C.

The reflective-surface position calculating unit 14C calculates by changing the position and the attitude of the virtual reflective surface so as to reduce the differences between the positions of the feature points within the virtual captured image and the positions of the corresponding feature points within the actual captured image. The reflective-surface position calculating unit 14C is provided with a projective transforming unit 16 and a resizing unit 17. The projective transforming unit 16 and the resizing unit 17 in the reflective-surface position calculating unit 14C operate in a manner similar to that of the projective transforming unit 16 and the resizing unit 17 in the mirror-image object position calculating unit 13 shown in FIG. 1. The reflective-surface position calculating unit 14C changes the position and the attitude of the virtual reflective surface, based on a projective transformation determined by the projective transforming unit 16, and based on a resizing factor determined by the resizing unit 17.

Figure 17:
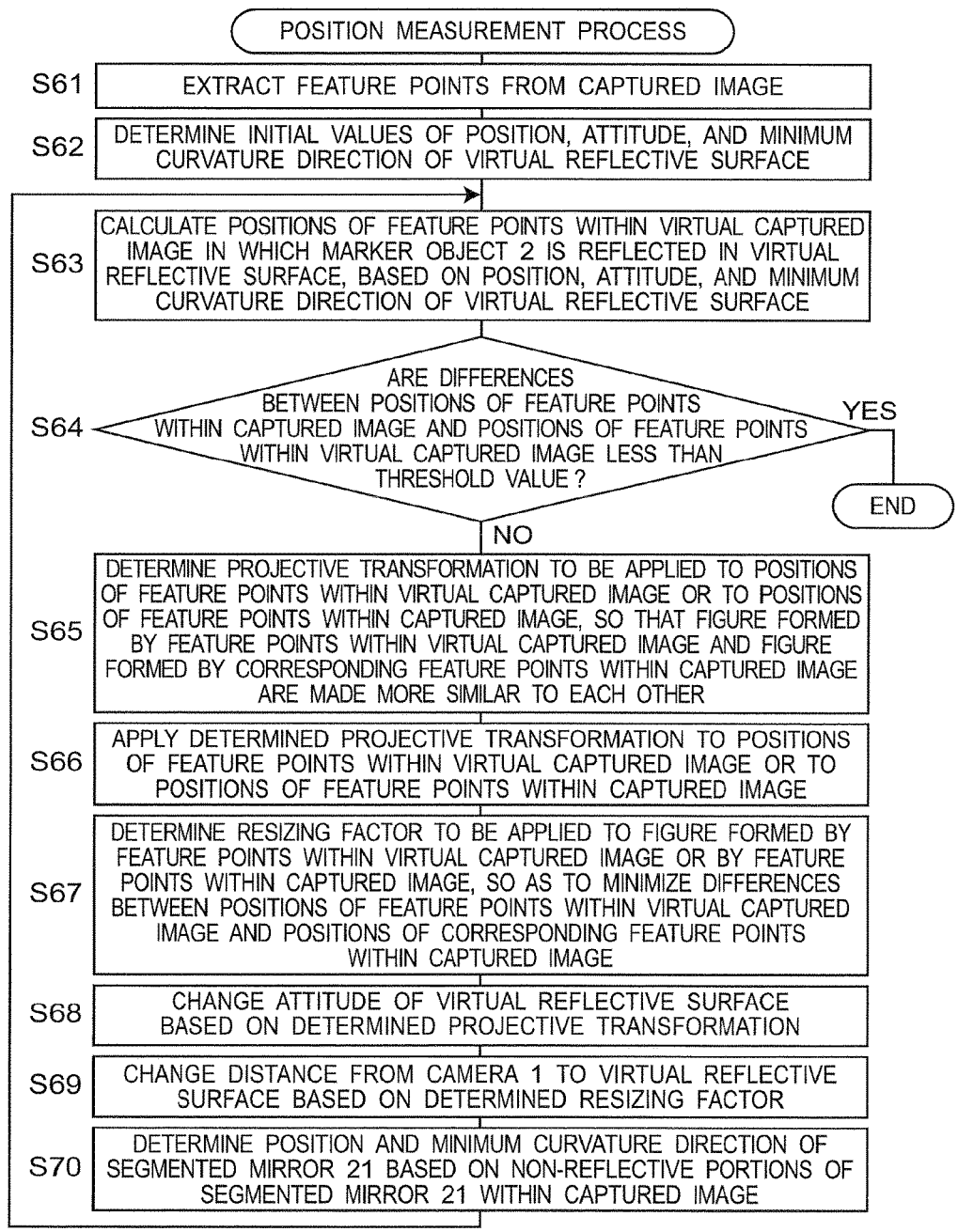
FIG. 17 is a flowchart for explaining a position measurement process that is executed by the position measurement apparatus according to the fourth embodiment of the present invention.

FIG. 17 is a flowchart for explaining the position measurement process that is executed by the position measurement apparatus according to the fourth embodiment of the present invention. The position measurement process shown in FIG. 17 is executed by the processing device 4C shown in FIG. 16 in order to measure the position of a target object.

In step S61 shown in FIG. 17, the feature point extracting unit 11 extracts feature points from the actual captured image that is captured by the camera 1, and the feature point extracting unit 11 transmits the information on the extracted feature points to the position measuring unit 12C. In step S62, the reflective-surface position calculating unit 14C determines initial values of the position, the attitude, and the minimum curvature direction of the virtual reflective surface. In step S63, the reflective-surface position calculating unit 14C calculates the positions of the feature points within the virtual captured image in which the marker object 2 is reflected in the virtual reflective surface, based on the position, the attitude, and the minimum curvature direction of the virtual reflective surface. In step S64, the reflective-surface position calculating unit 14C determines whether or not the differences between the positions of the feature points within the captured image and the positions of the corresponding feature points within the virtual captured image are less than the threshold value. When the differences between the feature points are less than the threshold value, that is, when a result of step S64 is YES, the process ends.

When the differences between the positions of the feature points are equal to or larger than the threshold value, that is, when a result of step S64 is NO, the process proceeds to step S65. In step S65, the projective transforming unit 16 in the reflective-surface position calculating unit 14C determines a projective transformation to be applied to the positions of the feature points within the captured image or to the positions of the feature points within the virtual captured image, the projective transformation being determined so that, by applying the projective transformation, the figure formed by the feature points within the virtual captured image and the figure formed by the corresponding feature points within the actual captured image are made geometrically more similar to each other. In step S66, the determined projective transformation is applied to the positions of the feature points within the actual captured image or to the positions of the feature points within the virtual captured image. In step S67, the resizing unit 17 in the reflective-surface position calculating unit 14C determines a resizing factor to be applied to the figure formed by the feature points within the virtual captured image or formed by the feature points within the actual captured image, the resizing factor being determined so as to minimize the differences between the positions of the feature points within the virtual captured image and the positions of the corresponding feature points within the actual captured image by applying the resizing factor. In step S68, the reflective-surface position calculating unit 14C changes the attitude of the virtual reflective surface, based on the determined projective transformation. In step S69, the reflective-surface position calculating unit 14C changes the distance from the camera 1 to the virtual reflective surface, based on the determined resizing factor. In step S70, the target-object positioning unit 15C determines the position and the minimum curvature direction of the segmented mirror 21, based on the non-reflective portions of the segmented mirror 21 within the captured image.

The reflective-surface position calculating unit 14C and the target-object positioning unit 15C repeat steps S63 to S70 until the differences between the positions of the feature points within the actual captured image and the positions of the corresponding feature points within the virtual captured image are less than the threshold value. The reflective-surface position calculating unit 14C and the target-object positioning unit 15C obtain the position, the attitude, and the minimum curvature direction of the reflective surface 22C by iterative calculation.

In this way, the processing device 4C determines the position of the segmented mirror 21C in the three-dimensional space, based on the virtual captured image obtained by virtually capturing the camera 1 and the marker object 2 that are virtually reflected in the virtual reflective surface. Therefore, it is possible to determine the position of the target object having a reflective surface in the three-dimensional space, without using a special light source and a wide dynamic-range camera.

Fifth Embodiment

In the position measurement apparatus according to the first embodiment, the positional relationship among the feature points that are stored in advance as the feature point data is in a mirror-image relation with the positional relationship among the actual feature points (an inverted positional relationship). On the other hand, in a fifth embodiment, a positional relationship which is the same as that of the actual feature points is used.

Figure 18:
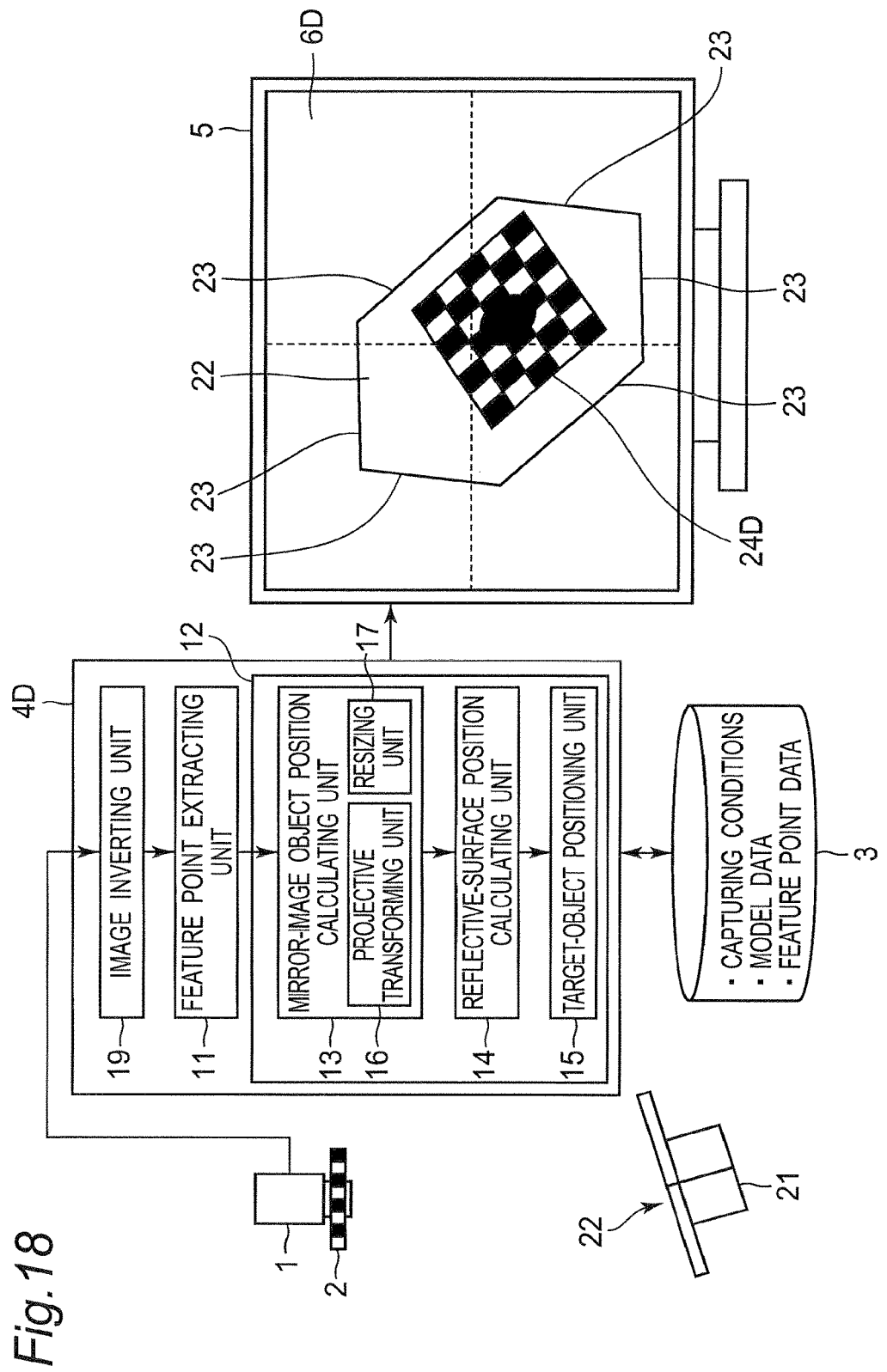
FIG. 18 is a block diagram showing a configuration of a position measurement apparatus according to a fifth embodiment of the present invention.

FIG. 18 is a block diagram showing a configuration of a position measurement apparatus according to the fifth embodiment of the present invention. The position measurement apparatus shown in FIG. 18 is provided with a processing device 4D, instead of the processing device 4 shown in FIG. 1. The processing device 4D is provided with an image inverting unit 19, in addition to the feature point extracting unit 11 and the position measuring unit 12 shown in FIG. 1. The image inverting unit 19 inverts horizontally the image captured by a camera 1, transmits an inverted image 6D, to a feature point extracting unit 11 as a captured image. As shown in a display device 5 in FIG. 18, the inverted image 6D includes an image inverted horizontally and representing a reflective surface 22 and edges 23 of a segmented mirror 21, and includes a mirror image 24D inverted horizontally and representing the camera 1 and the marker object 2 reflected in the reflective surface 22 of the segmented mirror 21 (that is, the image of the camera 1 and the marker object 2 that are in the same positional relationship as that of the actual positions of the camera 1 and the marker object 2). A storage device 3 (a third storage device) stores in advance the positional relationship that is the same as the positional relationship among the actual feature points (feature points having a non-inverted positional relationship), as feature point data. In other aspects, the fifth embodiment is similar to the first embodiment.

The processing device 4D executes the position measurement process shown in FIGS. 4 and 5. A position measuring unit 12 shown in FIG. 18 can calculate the positions of a plurality of the feature points included in the mirror-image object, and calculate the position and the orientation of the reflective surface 22 based on the positions of the feature points on the mirror-image object, in a manner similar to that of the position measuring unit 12 shown in FIG. 1. A mirror-image object position calculating unit 13 calculates the positions of the feature points included in the mirror-image object, based on the captured image as an inverted image, and based on the feature point data having a non-inverted positional relationship. A reflective-surface position calculating unit 14 and a target-object positioning unit 15 calculate the position and the orientation of the reflective surface 22, and determine the position of the segmented mirror 21.

An image inverting unit 19 and feature point data in the fifth embodiment (the feature point data having the same positional relationship as that of the actual feature points) can be also applied to the second to fourth embodiments.

Sixth Embodiment

Figure 19:
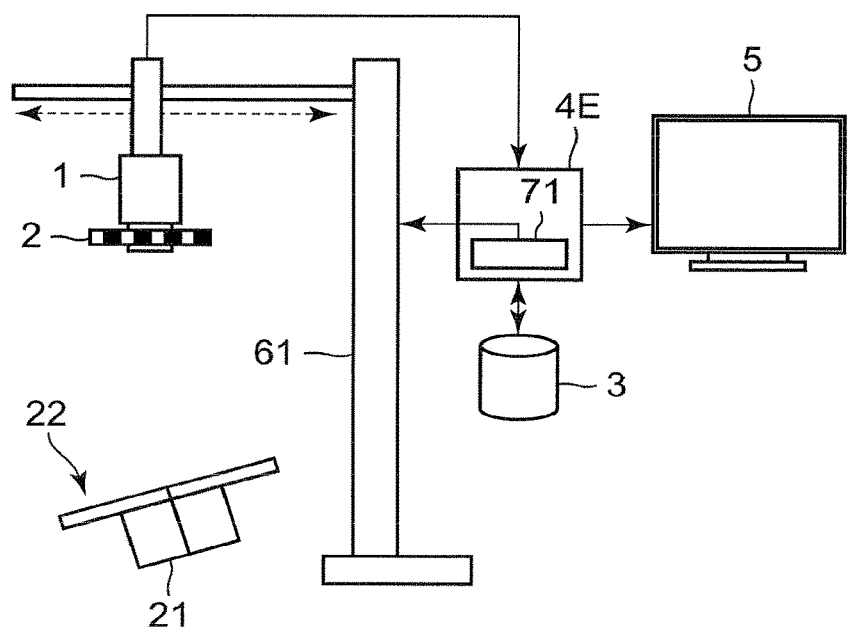
FIG. 19 is a block diagram showing a configuration of a position measurement apparatus according to a sixth embodiment of the present invention.

FIG. 19 is a block diagram showing a configuration of a position measurement apparatus according to a sixth embodiment of the present invention. The position measurement apparatus shown in FIG. 19 is further provided with a drive device 61 that moves a camera 1 (and a marker object 2), in addition to having the configuration of the position measurement apparatus shown in FIG. 1. In addition, the position measurement apparatus shown in FIG. 19 is provided with a processing device 4E, instead of the processing device 4 shown in FIG. 1. The processing device 4E is further provided with a camera controlling unit 71 that controls the drive device 61 and the shooting direction of the camera 1, in addition to having the configuration of the processing device according to one of the first to fifth embodiments. The drive device 61 and the camera controlling unit 71 configure a camera drive device that moves the camera 1 so that at least one of the viewpoint position and the shooting direction of the camera 1 is changed.

In order to cope with the case where the size of a segmented mirror 21 is larger than the visual field of the camera 1, the visual field may be enlarged by moving the camera 1 using the drive device 61, as shown in FIG. 19. In this case, in order to be able to use a consistent coordinate system even when the camera 1 is moved, the origin of the coordinates is provided at not the position of the moving camera 1, but at the position of the drive device 61 or at any other fixed position, so that the position of the camera 1 is calibrated in advance relative to the drive device 61.

The processing device 4E obtains a plurality of captured images by capturing the segmented mirror 21 under at least two sets of capturing conditions among a plurality of sets of capturing conditions, each set of capturing conditions being different from other sets of capturing conditions in at least one of the viewpoint position and the shooting direction. For example, the processing device 4E moves the camera 1 using the drive device 61, and capture the segmented mirror 21 at a plurality of positions (that is, under the plurality of sets of capturing conditions) to obtain a plurality of captured images. The processing device 4E stores a combination of a plurality of captured images and a plurality of sets of capturing conditions, each set used when capturing a corresponding captured image, in a storage device 3 (a first storage unit). A feature point extracting unit of the processing device 4E extracts a plurality of feature points from each of the plurality of captured images, and determines positions of the feature points within each of the plurality of captured images. Hereinafter, a set that includes the positions of the plurality of feature points extracted from one captured image is referred to as a feature point set. The processing device 4E stores a combination of the positions of the extracted feature points within the captured image, a corresponding captured image, and a corresponding set of capturing conditions, in the storage device 3 (the first storage unit). The storage device 3 (the first storage unit) stores a plurality of captured data sets, each captured data set including a captured image, a set of capturing conditions used when capturing the captured image, and the feature point set of the captured image. Each captured data set may include any other information. The position measuring unit of the processing device 4E may execute the position measurement process for one captured data set in a manner similar to any of the processing devices in the first to fifth embodiments, and determine the position of the segmented mirror 21 in the three-dimensional space. Alternatively, the processing device 4E may execute the position measurement process by processing the plurality of captured data sets in combination, and determine the position of the segmented mirror 21 in the three-dimensional space. In this way, it is possible to measure, in the three-dimensional space, the position of the segmented mirror 21 having a larger size than the visual field of the camera 1.

For example, the position measuring unit of the processing device 4E may calculate the position of the segmented mirror 21, based on model data, feature point data, a plurality of feature point sets each corresponding to each of the plurality of captured images, and a plurality of sets of capturing conditions each set corresponding to each of the plurality of captured images.

When the processing device 4E has a mirror-image object position calculating unit, the mirror-image object position calculating unit may calculate positions of a plurality of feature points that are included in the mirror-image object, which is obtained for each captured data set, so that the positions of a plurality of the feature points included in a virtual captured image obtained by virtually capturing the mirror-image object under a capturing conditions in the captured data set are close to positions of a plurality of the corresponding feature points within the actual captured image under the capturing conditions. In other words, the mirror-image object position calculating unit obtains a plurality of mirror-image objects corresponding to the plurality of captured data sets, respectively. Next, a reflective-surface position calculating unit of the processing device 4E may calculate the position and the orientation of the reflective surface 22, based on the positions of the feature points on the camera 1 and the marker object 2 that are determined according to the viewpoint position and the feature point data, based on the positions of a plurality of the feature points which are included in the plurality of mirror-image objects each corresponding to each of the plurality of captured data sets, and based on the curvature radius of the reflective surface 22.

The reflective-surface position calculating unit may process the positions of the feature points on the plurality of mirror-image objects each corresponding to each of the plurality of captured data sets, in a separate manner for each of the captured data sets, or in a combined manner for all the captured data sets. When combining the positions of the feature points on the mirror-image objects, they can be arbitrarily combined. The positions of the feature points on the mirror-image objects corresponding to all the captured data sets may be processed in a simultaneous manner, or in a sequential manner. A predetermined number (for example, two) of captured data sets may be processed in a simultaneous manner, that is, the positions of the feature points on the mirror-image objects each corresponding to each of the predetermined number of captured data sets may be processed in a simultaneous manner. The reflective-surface position calculating unit may combine positions and orientations of the reflective surface processed and calculated separately for each of the captured data sets, with the position and the orientation of the reflective surface processed and calculated for a plurality of captured data sets in combination, and process combined ones.

A target-object positioning unit of the processing device 4E may separately process a plurality of portions of the segmented mirror 21 captured in a plurality of images, or simultaneously process the plurality of portions of the segmented mirror 21 captured in the plurality of images, to determine the position of the segmented mirror 21 as a target object based on model data.

When the processing device obtains the position and the orientation of the reflective surface using a virtual reflective surface (when the processing device does not obtain a mirror-image object), the reflective-surface position calculating unit may individually process virtual reflective surfaces each corresponding to each of the plurality of captured data sets, in a separate manner, or in any combined manner.

In this way, the reflective-surface position calculating unit calculates the position and the orientation of the reflective surface 22, from positions of the feature points on the plurality of mirror-image objects (the first embodiment), or from the plurality of feature point sets (the second to fourth embodiments), that is, from input data of the reflective-surface position calculating unit inputted corresponding to the plurality of captured data sets.

In addition, the reflective-surface position calculating unit of the processing device 4E may calculate a plurality of positions and orientations of the reflective surface 22 each corresponding to each of the plurality of captured data sets.

Next, the target-object positioning unit of the processing device 4E may determine the position of the segmented mirror 21, based on a positional relationship among the reflective surface and non-reflective portions stored in advance as model data, and based on a combination of the plurality of positions and the orientations of the reflective surface 22, which are calculated by the reflective-surface position calculating unit.

The features described in the sixth embodiment can be applied in any other embodiments, when obtaining the position of a target object using captured images each captured under different capturing conditions.

Seventh Embodiment

Figure 20:
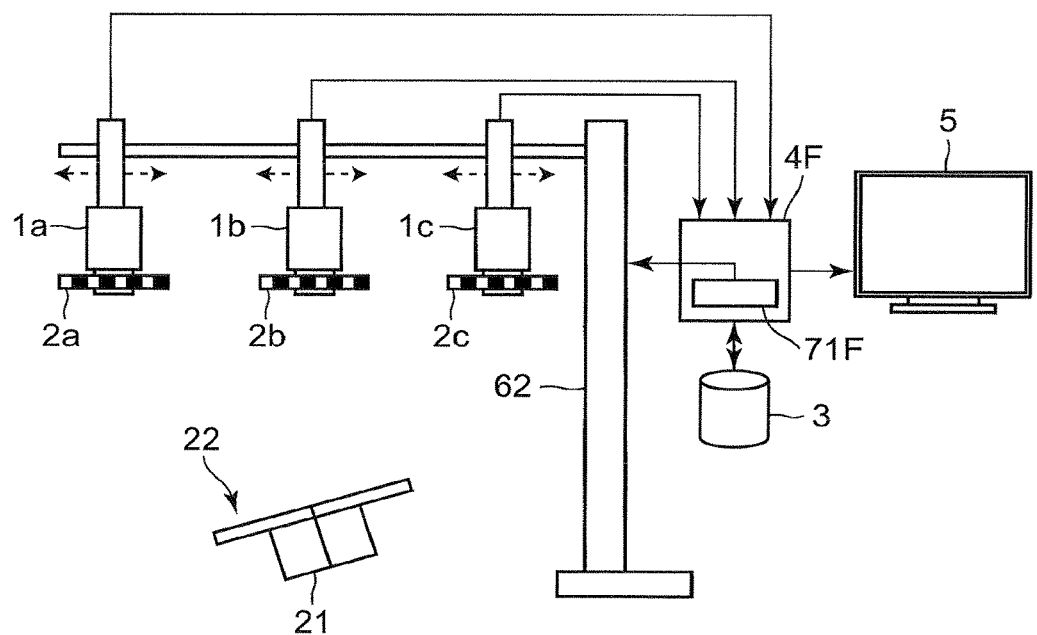
FIG. 20 is a block diagram showing a configuration of a position measurement apparatus according to a seventh embodiment of the present invention.

FIG. 20 is a block diagram showing a configuration of a position measurement apparatus according to a seventh embodiment of the present invention. The position measurement apparatus shown in FIG. 20 is provided with, for example, three cameras 1a, 1b, and 1c, marker objects 2a, 2b, and 2c, and a fixing jig 62 that supports the cameras 1a, 1b, and 1c, in addition to the configuration of the position measurement apparatus shown in FIG. 1. The cameras 1a, 1b, and 1c capture different regions that include different points on the edges 23 of a reflective surface 22, respectively. The position measurement apparatus shown in FIG. 20 is provided with a processing device 4F, instead of the processing device 4E in the sixth embodiment. The processing device 4F is substantially similar to the processing device 4E, and is provided with a camera controlling unit 71F that controls shooting directions of the cameras 1a, 1b, and 1c. The position measurement apparatus may be provided with a drive device that moves at least one of the cameras among the plurality of cameras. For a movable camera, the camera controlling unit 71F also controls the drive device of the movable camera. A viewpoint position and a shooting direction of at least one camera may be fixed. The positional relationships between the cameras 1a, 1b, and 1c and the marker objects 2a, 2b, and 2c may be different for each camera, or some cameras may have the same positional relationships with the marker objects.

When moving the camera 1 in order to measure the position of the segmented mirror 21 having a large size in the three-dimensional space, like in the sixth embodiment, it takes long time to move the camera, and accordingly, it takes long time for the measurement. Therefore, as shown in FIG. 20, by using a plurality (for example, three) of cameras 1a, 1b, and 1c and a plurality of marker objects 2a, 2b, and 2c, it is possible to measure at one time all positions of the entire segmented mirror 21 in the three-dimensional space, without moving the cameras. By setting in advance a world coordinate system as a reference, the positions of the cameras 1a, 1b, and 1c are calibrated in advance on the world coordinate system.

The processing device 4F extracts different sections of the edges 23 of the reflective surface 22, from captured images of the segmented mirror 21 captured by the cameras 1a, 1b, and 1c, and determines straight lines directed from each of the cameras 1a, 1b, and 1c toward at least one point in the corresponding section of the edges 23 of the reflective surface 22, based on the positions of the pixels on the edges within the captured images. Each of the cameras 1a, 1b, and 1c measures the position of at least one point on the edges 23 on the reflective surface 22. For example, when the position measurement apparatus is provided with two cameras, the two cameras are used to determine straight lines directed toward at least three points on the corresponding sections of the edges 23 of the reflective surface 22. The position measurement apparatus calculates positions of intersections of the straight lines and a surface including the reflective surface 22 of the segmented mirror 21, and determines the intersections as points on the edges 23 of the reflective surface 22. Further, the captured images obtained by the cameras 1a, 1b, and 1c may be processed in a separate manner to determine positions of approximate planes. Alternatively, approximate planes each for each of the cameras may be determined based on the reflective-surface model so that errors are minimized for the entire reflective surface 22.

The processing device 4F converts the positions of at least three points on the segmented mirror 21 obtained as described above, into a predetermined reference position of the segmented mirror 21, the direction in which the reflective surface 22 of the segmented mirror 21 is directed (a reflective-surface direction), and the position of the handle of the segmented mirror 21 around the reflective-surface direction, so that the holding mechanism for the segmented mirror 21 can treat them easily. Therefore, it is possible to determine the position of the segmented mirror in the three-dimensional space, without using a special light source and a wide dynamic-range camera. In addition, it is possible to determine the position of the segmented mirror 21 in the three-dimensional space based on the images captured at one time by the cameras 1a, 1b, and 1c, and thus, reduce the calculation time.

The processing device 4F extracts a plurality of feature points included in a mirror image 24 of the camera and the marker object reflected in the reflective surface 22 of the segmented mirror 21, from the captured image of the segmented mirror 21 captured by only one of the cameras 1a, 1b, and 1c. The processing device 4F calculates positions of dividing points for dividing into two parts each of the segments connecting between the positions of the extracted feature points and the positions of corresponding feature points stored in a storage device 3, by a dividing ratio determined according to the curvature radius of the reflective surface, and determines the dividing points each dividing each of the segments in two parts, as the points existing on the reflective surface of the segmented mirror 21. The processing device 4F determines a surface including the reflective surface 22 of the segmented mirror 21, by fitting the equation of a plane or a curved surface to the points at which the segments connecting between the extracted feature points and the corresponding feature points stored in the storage device 3 are divided in two parts. The processing device 4F extracts the edges 23 of the reflective surface 22 from the captured images captured by the cameras 1a, 1b, and 1c, determines straight lines directed from the cameras 1a, 1b, and 1c to a plurality of points on the edges 23 of the reflective surface 22, calculates intersections of the straight lines and the surfaces including the reflective surface of the segmented mirror 21, and determines the intersections as the points on the edges 23 of the reflective surface 22.

The processing device 4F can quickly measure the position of the segmented mirror 21 having a larger size than the visual field of each camera, in the three-dimensional space, by executing the process of determining the position of the segmented mirror 21 in the three-dimensional space, in a similar manner to that of the processing device 4 in the first embodiment, using the images captured by the cameras 1a, 1b, and 1c.

According to the seventh embodiment, it is possible to obtain the position of a target object based on three or more points, by using two or more cameras, and determining a position of one or more points on the edges 23 of the reflective surface 22 within a photographing range of each camera. According to the seventh embodiment, it is possible to arrange a shape model of the target object so that a sum of errors between the shape model and a measured position of the target object is minimized.

Modified Embodiment

The processes of determining the position of the segmented mirror in the three-dimensional space by the processing devices 4 to 4F may be executed by a dedicated hardware device, or executed by software that operates on a general-purpose processor. The processor of the processing device executes steps of, for example: storing capturing conditions that includes a viewpoint position and a shooting direction of the camera 1, in a first storage unit; storing model data that includes a shape of the segmented mirror 21 having a reflective surface, in a second storage unit; arranging a marker object having a plurality of feature points, at a predetermined position with respect to the camera 1; storing feature point data that represents a mutual positional relationship among the viewpoint position and the feature points, in a third storage unit; obtaining a captured image by the camera 1, the captured image including at least a part of the reflective surface 22 in which multiple feature point among the plurality of feature points are reflected; extracting the multiple feature points from the captured image, and determining positions of the feature points within the captured image; and calculating a position of the segmented mirror 21, based on the capturing conditions, the model data, the feature point data, and the positions of the feature points within the captured image.

The above embodiments can be variously modified within the scope of the intent of the present invention. The embodiments are intended to describe the present invention, and are not intended to limit the scope of the present invention. The scope of the present invention is indicated by appended claims rather than by the embodiments. Various modifications made within the claims and within the range equivalent to the claimed invention are included in the scope of the present invention.

REFERENCE SIGNS LIST 1, 1a, 1b, and 1c: CAMERA,
1M: VIRTUAL CAMERA,
2, 2a, 2b, and 2c: MARKER OBJECT,
2M: VIRTUAL MARKER OBJECT,
3: STORAGE DEVICE,
4, 4A, 4B, 4C, 4D, 4E, and 4F: PROCESSING DEVICE,
5: DISPLAY DEVICE,
6 and 6D: IMAGE,
11: FEATURE POINT EXTRACTING UNIT,
12, 12A, 12B, and 12C: POSITION MEASURING UNIT,
13: MIRROR-IMAGE OBJECT POSITION CALCULATING UNIT,
14, 14A, 14B, and 14C: REFLECTIVE-SURFACE POSITION CALCULATING UNIT,
15: TARGET-OBJECT POSITIONING UNIT,
16: PROJECTIVE TRANSFORMING UNIT,
17: RESIZING UNIT,
18: CURVATURE CALCULATING UNIT,
19: IMAGE INVERTING UNIT,
21 and 21C: SEGMENTED MIRROR,
22 and 22C: REFLECTIVE SURFACE,
23: EDGE,
24 and 24D: MIRROR IMAGE, 61: DRIVE DEVICE,
62: FIXING JIG, and
71 and 71F: CAMERA CONTROLLING UNIT.

The invention claimed is:

1. A position measurement apparatus comprising:
a camera to capture an image including at least a part of a reflective surface of a target object;
a first memory to store capturing conditions including a viewpoint position and a shooting direction of the camera;
a second memory to store model data including a shape of the target object;
a marker object having a plurality of feature points and being fixed at a predetermined position with respect to the camera, the marker object being separated from the target object, wherein the camera captures a mirror image of the marker object reflected in the at least part of the reflective surface of the target object, when capturing the image including the at least part of the reflective surface of the target object;
a third memory to store feature point data representing a mutual positional relationship among the viewpoint position and the feature points;
a processor configured to
extract multiple feature points of the plurality of feature points from a captured image that is captured by the camera, the captured image including the mirror image of the marker object, the mirror image including the multiple feature points on the marker object,
determine positions of the extracted multiple feature points within the captured image,
calculate a position of the target object, based on the capturing conditions stored in the first memory, the model data stored in the second memory, the feature point data stored in the third memory, and the positions of the extracted multiple feature points within the captured image, and
output the calculated position of the target object.

2. The position measurement apparatus as claimed in claim 1,
wherein the target object has the reflective surface and non-reflective portions,
wherein the model data includes a shape of the reflective surface, including a curvature radius of the reflective surface, and includes a positional relationship among the reflective surface and the non-reflective portions, and
wherein the processor is further configured to calculate positions of a plurality of the feature points included in a mirror-image object of the marker object virtually existing at an opposite side of a side including the marker object with respect to the reflective surface, based on the feature point data, the processor obtaining a virtual captured image by virtually capturing the mirror-image object under the capturing conditions and calculating positions of the feature points within the virtual captured image to be close to positions of a plurality of the corresponding feature points within the captured image,
calculate a position and an orientation of the reflective surface, based on the positions of the feature points on the marker object determined according to the viewpoint position and the feature point data, the calculated positions of the feature points on the mirror-image object, and the curvature radius of the reflective surface, and
determine the position of the target object, based on the positional relationship among the reflective surface and the non-reflective portions, and based on the calculated position and orientation of the reflective surface.

3. The position measurement apparatus as claimed in claim 2, wherein the processor calculates the positions of the plurality of the feature points included in the mirror-image object to reduce differences between the positions of the feature points within the virtual captured image and the positions of the corresponding feature points within the captured image.

4. The position measurement apparatus as claimed in claim 3, wherein the processor is further configured to:
determine a projective transformation to be applied to the positions of the feature points within the captured image or to the positions of the feature points within the virtual captured image, the projective transformation being determined so that, by applying the projective transformation, a figure formed by the feature points within the virtual captured image and a figure formed by the corresponding feature points within the captured image are made geometrically more similar to each other,
determine, after applying the determined projective transformation to the positions of the feature points within the captured image or to the positions of the feature points within the virtual captured image, a resizing factor to be applied to the figure formed by the feature points within the virtual captured image or to the figure formed by the corresponding feature points within the captured image, the resizing factor being determined to reduce differences between the positions of the feature points within the virtual captured image and the positions of the corresponding feature points within the captured image by applying the resizing factor, and
calculate the positions of the plurality of the feature points included in the mirror-image object, based on the determined projective transformation and the determined resizing factor.

5. The position measurement apparatus as claimed in claim 2,
wherein the model data includes a reflective-surface model that represents the shape of the reflective surface, and
wherein the processor determines a position and an orientation of an approximate plane approximating the reflective surface near an intersection of the reflective surface and a straight line, the straight line passing through the viewpoint position and being perpendicular to the reflective surface, and determines a position and an orientation of the reflective-surface model so that the reflective-surface model is tangent to the approximate plane at the intersection, thereby determining the position and the orientation of the reflective surface.

6. The position measurement apparatus as claimed in claim 1,
wherein the target object has the reflective surface and non-reflective portions,
wherein the model data includes a shape of the reflective surface, and a positional relationship among the reflective surface and the non-reflective portions, and
wherein the processor is further configured to
calculate a position and an orientation of the reflective surface, based on the shape of the reflective surface and the feature point data, the processor obtaining a virtual captured image by virtually capturing under the capturing conditions, a plurality of feature points reflected in the reflective surface whose position and orientation are virtually determined, calculating positions of the plurality of the feature points included in the virtual captured image and calculating the position and the orientation of the reflective surface so that the positions of the plurality of the feature points within the virtual captured image are close to positions of a plurality of the corresponding feature points within the captured image, and determine the position of the target object, based on a positional relationship among the reflective surface and the non-reflective portions, and based on the calculated position and orientation of the reflective surface.

7. The position measurement apparatus as claimed in claim 6, wherein the processor calculates the position and the orientation of the reflective surface so as to reduce differences between the positions of the feature points within the virtual captured image and the positions of the corresponding feature points within the captured image.

8. The position measurement apparatus as claimed in claim 7, wherein the processor is further configured to determine a projective transformation to be applied to the positions of the feature points within the captured image or to the positions of the feature points within the virtual captured image, the projective transformation being determined so that, by applying the projective transformation, a figure formed by the feature points within the virtual captured image and a figure formed by the corresponding feature points within the captured image are made geometrically more similar to each other, and determine, after applying the determined projective transformation to the positions of the feature points within the captured image or to the positions of the feature points within the virtual captured image, a resizing factor to be applied to the figure formed by the feature points within the virtual captured image or to the figure formed by the corresponding feature points within the captured image, the resizing factor being determined so as to reduce differences between the positions of the feature points within the virtual captured image and the positions of the corresponding feature points within the captured image by applying the resizing factor, and calculate the position and the orientation of the reflective surface, based on the determined projective transformation and the determined resizing factor.

9. The position measurement apparatus as claimed in claim 7, wherein the processor is further configured to estimate a curvature radius of the reflective surface, based on differences between the positions of the feature points within the captured image and the positions of the corresponding feature points within the virtual captured image, and based on distances from a certain point within the captured image or within the virtual captured image to the feature points within the captured image or to the feature points within the virtual captured image, the certain point corresponding to an intersection of the reflective surface and a straight line, the straight line passing through the viewpoint position and being perpendicular to the reflective surface.

10. The position measurement apparatus as claimed in claim 1, wherein the processor extracts a plurality of the feature points from the each of a plurality of captured images, each of the plurality of captured images being captured under one set of capturing conditions among a plurality sets of the capturing conditions, the plurality of sets of the capturing conditions differ in at least one of the viewpoint position and the shooting direction from each other, and the processor determines positions of the feature points within each of the plurality of the captured images, and wherein the processor calculates the position of the target object, based on the plurality of sets of the capturing conditions, the model data, the feature point data, and a plurality of feature point sets, each of the plurality of feature point sets corresponding to each of the plurality of captured images, and including the positions of the feature points within the corresponding captured image.

11. The position measurement apparatus as claimed in claim 10, comprising a plurality of the cameras installed at different positions.

12. The position measurement apparatus as claimed in claim 10, comprising a camera drive device that moves the camera so that at least one of the viewpoint position and the shooting direction differs.

13. The position measurement apparatus as claimed in claim 2, wherein the processor extracts a plurality of the feature points from each of a plurality of captured images, each of the plurality of captured images being captured under one set of capturing conditions among a plurality of sets of the capturing conditions, the plurality of sets of the capturing conditions differ in at least one of the viewpoint position and the shooting direction from each other, and the processor determines positions of the feature points within each of the plurality of the captured images, wherein the processor calculates positions of the feature points included in each of a plurality of the mirror-image objects, each of the plurality of mirror-image objects corresponding to the one set of the capturing conditions and to the plurality of feature points within the captured image captured under the one set of capturing conditions, and wherein the processor calculates the position and the orientation of the reflective surface, by processing the plurality of the positions of the feature points included in the plurality of the mirror-image objects in combination.

14. The position measurement apparatus as claimed in claim 6, wherein the processor extracts a plurality of the feature points from each of a plurality of captured images, each of the plurality of captured images being captured under one set of capturing conditions among a plurality of sets of the capturing conditions, the plurality of sets of the capturing conditions differ in at least one of the viewpoint position and the shooting direction from each other, and the processor determines positions of the feature points within each of the plurality of the captured images, and wherein the processor calculates the position and the orientation of the reflective surface, by processing the plurality of sets of the capturing conditions and the plurality of the feature points within the captured images in combination.

15. The position measurement apparatus as claimed in claim 2, wherein the processor extracts a plurality of the feature points from each of a plurality of captured images, each of the plurality of captured images being captured under one set of capturing conditions among a plurality of sets of the capturing conditions, the plurality of sets of the capturing conditions differ in at least one of the viewpoint position and the shooting direction from each other, and the processor determines positions of the feature points within each of the plurality of the captured images, wherein the processor calculates a plurality of positions and orientations of the reflective surface, each of the plurality of positions and orientations of the reflective surface corresponding to each of the plurality of the captured images, and wherein the processor determines the position of the target object, based on the positional relationship among the reflective surface and the non-reflective portions and, and based on the plurality of the calculated positions and orientations of the reflective surface.

16. A position measurement method which is executed by a processing device that determines a position of a target object, the position measurement method comprising:

storing capturing conditions including a viewpoint position and a shooting direction of a camera, in a first memory;

storing model data including a shape of the target object having a reflective surface, in a second memory;

arranging a marker object having a plurality of feature points, at a predetermined position with respect to the camera, the marker object being separated from the target object;

storing feature point data representing a mutual positional relationship among the viewpoint position and the feature points, in a third memory;

obtaining a captured image by the camera, the captured image including at least a part of the reflective surface in which a mirror image of the marker object is reflected, the mirror image including multiple feature points of the plurality of feature points on the marker object;

extracting the multiple feature points from the captured image and determining positions of the extracted multiple feature points within the captured image; and calculating a position of the target object, based on the capturing conditions stored in the first memory, the model data stored in the second memory, the feature point data stored in the third memory, and the positions of the multiple feature points within the captured image extracted by the extracting.

17. The position measurement apparatus as claimed in claim 3, wherein the model data includes a reflective-surface model that represents the shape of the reflective surface, and wherein the processor determines a position and an orientation of an approximate plane approximating the reflective surface near an intersection of the reflective surface and a straight line, the straight line passing through the viewpoint position and being perpendicular to the reflective surface, and determines a position and an orientation of the reflective-surface model so that the reflective-surface model is tangent to the approximate plane at the intersection, thereby determining the position and the orientation of the reflective surface.

18. The position measurement apparatus as claimed in claim 4, wherein the model data includes a reflective-surface model that represents the shape of the reflective surface, and wherein the processor determines a position and an orientation of an approximate plane approximating the reflective surface near an intersection of the reflective surface and a straight line, the straight line passing through the viewpoint position and being perpendicular to the reflective surface, and determines a position and an orientation of the reflective-surface model so that the reflective-surface model is tangent to the approximate plane at the intersection, thereby determining the position and the orientation of the reflective surface.

19. The position measurement apparatus as claimed in claim 8, wherein the processor is further configured to estimate a curvature radius of the reflective surface, based on differences between the positions of the feature points within the captured image and the positions of the corresponding feature points within the virtual captured image, and based on distances from a certain point within the captured image or within the virtual captured image to the feature points within the captured image or to the feature points within the virtual captured image, the certain point corresponding to an intersection of the reflective surface and a straight line, the straight line passing through the viewpoint position and being perpendicular to the reflective surface.

20. The position measurement apparatus as claimed in claim 6, wherein the processor extracts a plurality of the feature points from each of a plurality of captured images, each of the plurality of captured images being captured under one set of capturing conditions among a plurality of sets of the capturing conditions, the plurality of sets of the capturing conditions differ in at least one of the viewpoint position and the shooting direction from each other, and the processor determines positions of the feature points within each of the plurality of the captured images, wherein the processor calculates a plurality of positions and orientations of the reflective surface, each of the plurality of positions and orientations of the reflective surface corresponding to each of the plurality of the captured images, and wherein the processor determines the position of the target object, based on the positional relationship among the reflective surface and the non-reflective portions, and based on the plurality of the calculated positions and orientations of the reflective surface.

* * * * *